United States Patent
Hu et al.

(10) Patent No.: US 11,131,827 B2
(45) Date of Patent: Sep. 28, 2021

(54) OPTICAL ELEMENT DRIVING MECHANISM

(71) Applicant: TDK TAIWAN CORP., Taoyuan (TW)

(72) Inventors: Chao-Chang Hu, Taoyuan (TW);
Chen-Hsien Fan, Taoyuan (TW);
Che-Wei Chang, Taoyuan (TW);
Liang-Ting Ho, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 231 days.

(21) Appl. No.: 16/408,820

(22) Filed: May 10, 2019

(65) Prior Publication Data
US 2019/0346651 A1 Nov. 14, 2019

Related U.S. Application Data

(60) Provisional application No. 62/670,580, filed on May 11, 2018.

(51) Int. Cl.
*G02B 7/02* (2021.01)
*G02B 7/09* (2021.01)
*G02B 27/64* (2006.01)

(52) U.S. Cl.
CPC .............. *G02B 7/02* (2013.01); *G02B 7/09* (2013.01); *G02B 27/646* (2013.01)

(58) Field of Classification Search
CPC .......... G02B 7/02; G02B 7/09; G02B 27/646; G02B 7/08; G02B 7/00
See application file for complete search history.

(56) References Cited

U.S. PATENT DOCUMENTS

| | | | |
|---|---|---|---|
| 2016/0109719 A1* | 4/2016 | Cho | G02B 27/646 359/557 |
| 2018/0343369 A1* | 11/2018 | Kim | G02B 7/08 |
| 2020/0089020 A1* | 3/2020 | Lee | H04N 5/23248 |

* cited by examiner

*Primary Examiner* — Cara E Rakowski
(74) *Attorney, Agent, or Firm* — Muncy, Geissler, Olds & Lowe, P.C.

(57) ABSTRACT

The present invention provides an optical element driving mechanism. The optical element driving mechanism includes a fixed part, a movable part and a driving assembly. The movable part is movably connected to the fixed part. The movable part includes a holder and a holder stopper. The holder carries the optical element. The holder includes a surface, a sidewall and a holder groove. The sidewall faces the optical element. The holder groove is disposed at the junction of the surface and the sidewall. The holder stopper protrudes from the surface along an optical axis of the optical element to limit a range of motion of the holder. The driving assembly drives the movable part to move relative to the fixed part.

22 Claims, 28 Drawing Sheets

OPTICAL ELEMENT DRIVING MECHANISM

CROSS-REFERENCE TO RELATED APPLICATIONS

The present application claims priority to U.S. Provisional Patent Application No. 62/670,580, filed on May 11, 2018.

BACKGROUND OF THE DISCLOSURE

Field of the Disclosure

The present disclosure relates to an optical element driving mechanism, and more particularly to an optical element driving mechanism of electrical devices.

Description of the Related Art

As the relevant technologies have developed, many electronic devices (such as cameras or smart phones) can record images and videos. However, when a lens having a long focal length is provided in an electronic device, the thickness thereof may be increased, impeding the prospects for miniaturization of the electronic device.

BRIEF SUMMARY OF THE DISCLOSURE

To solve the problem of the prior art, an optical element driving mechanism is provided. The optical element driving mechanism includes a fixed part, a movable part and a driving assembly. The movable part is movably connected to the fixed part. The movable part includes a holder and a holder stopper. The holder carries an optical element. The holder includes a surface, a sidewall facing the optical element and a holder groove disposed at a junction of the surface and the sidewall. The holder stopper protrudes from the surface along an optical axis of the optical element to limit a range of motion of the holder. The driving assembly drives the movable part to move relative to the fixed part.

In one of the embodiments of the present disclosure, the movable part further includes a first elastic element disposed on the surface. The first elastic element is flexible along the optical axis. The optical element driving mechanism further includes a circuit component disposed on the holder. The circuit component overlaps the first elastic element when observed along the optical axis. The first elastic element includes a string connection portion, an electrical connection portion and a holder connection portion. The string connection portion is elastically flexible along the optical axis. The electrical connection portion is connected to the holder. The holder connection portion is located between the string connection portion and the electrical connection portion. The holder connection portion is connected to the holder. The optical element driving mechanism further includes a damping member. The holder further includes a protruding portion. The driving assembly includes a driving coil. The driving coil is in contact with the protruding portion. The damping member is disposed on the protruding portion. The protruding portion includes a narrow section to accommodate a part of the driving coil.

In one of the embodiments of the present disclosure, the holder further includes a stopping portion. The driving assembly includes a driving coil. A part of the driving coil is in contact with the stopping portion. The stopping portion faces away from the surface. The fixed part includes a metallic base and a circuit plate. The metallic base includes a metallic base side. The circuit plate is disposed on the metallic base. The circuit plate includes a plate electrical connecting portion, an insulated portion and a circuit plate side. The insulated portion is disposed between the plate electrical connecting portion and the metallic base. The circuit plate side is in contact with the metallic base side. The movable part further includes a frame. The driving assembly includes a driving magnetic element. The frame includes a frame body and a metallic framework. The metallic framework is disposed in the frame body, and the metallic framework is located between the frame body and the driving magnetic element. A part of the metallic framework is covered by the frame body, and the other part of the metallic framework is exposed from the frame body. The metallic framework includes an accommodation portion. A part of the accommodation portion is exposed from the frame body.

In one of the embodiments of the present disclosure, another optical element driving mechanism is provided. The optical element driving mechanism includes a fixed part, a movable part and a driving assembly. The movable part is movably connected to the fixed part and carries an optical element. The movable part includes a first elastic element, a frame and a frame stop assembly. The frame is connected to the first elastic element. The frame includes a frame body, a positioning assembly and a first groove. The positioning assembly is disposed on the frame body. The positioning assembly protrudes along an optical axis of the optical element and fixing the first elastic element. The first groove accommodates a part of the first elastic element. The frame stop assembly protrudes along the optical axis and limits a range of motion of the movable part. The driving assembly drives the movable part to move relative to the fixed part. A length of the frame stop assembly in a direction of the optical axis is greater than a length of the positioning assembly in the direction of the optical axis.

In one of the embodiments of the present disclosure, the optical element driving mechanism further includes an adhesive. The movable part further includes a second elastic element. The frame body includes a frame groove. The driving assembly includes a driving magnetic element. The frame groove is adjacent to the second elastic element and the driving magnetic element. The adhesive is disposed in the frame groove to fix the second elastic element and the driving magnetic element to the frame body. The movable part further includes a third elastic element movably connected to the fixed part. The first elastic element is connected to the frame body. The first elastic element includes a string connection portion connected to the third elastic element. The first elastic element is flexible along the optical axis. The frame further includes a second groove accommodating a part of the third elastic element. The movable part further includes a holder elastically connected to the frame body. The driving assembly includes a driving magnetic element disposed on the frame body. The frame further includes a first side-stop mechanism facing the holder to limit a range of motion of the holder in a direction perpendicular to the optical axis. The driving magnetic element includes a second side-stop mechanism facing toward the holder to limit the range of motion of the holder along the direction perpendicular to the optical axis. The fixed part further includes a flat coil. The movable part further includes a connecting portion. The flat coil includes a dodging groove corresponding to the connecting portion.

In order to illustrate the purposes, features, and advantages of the invention, the preferred embodiments and drawings of the invention are shown in detail as follows.

DETAILED DESCRIPTION OF THE DISCLOSURE

The making and using of optical element driving mechanisms of embodiments of the present disclosure are discussed in detail below. It should be appreciated, however, that the embodiments provide many applicable inventive concepts that can be embodied in a wide variety of specific contexts. The specific embodiments discussed are merely illustrative of specific ways to make and use the embodiments and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1A:
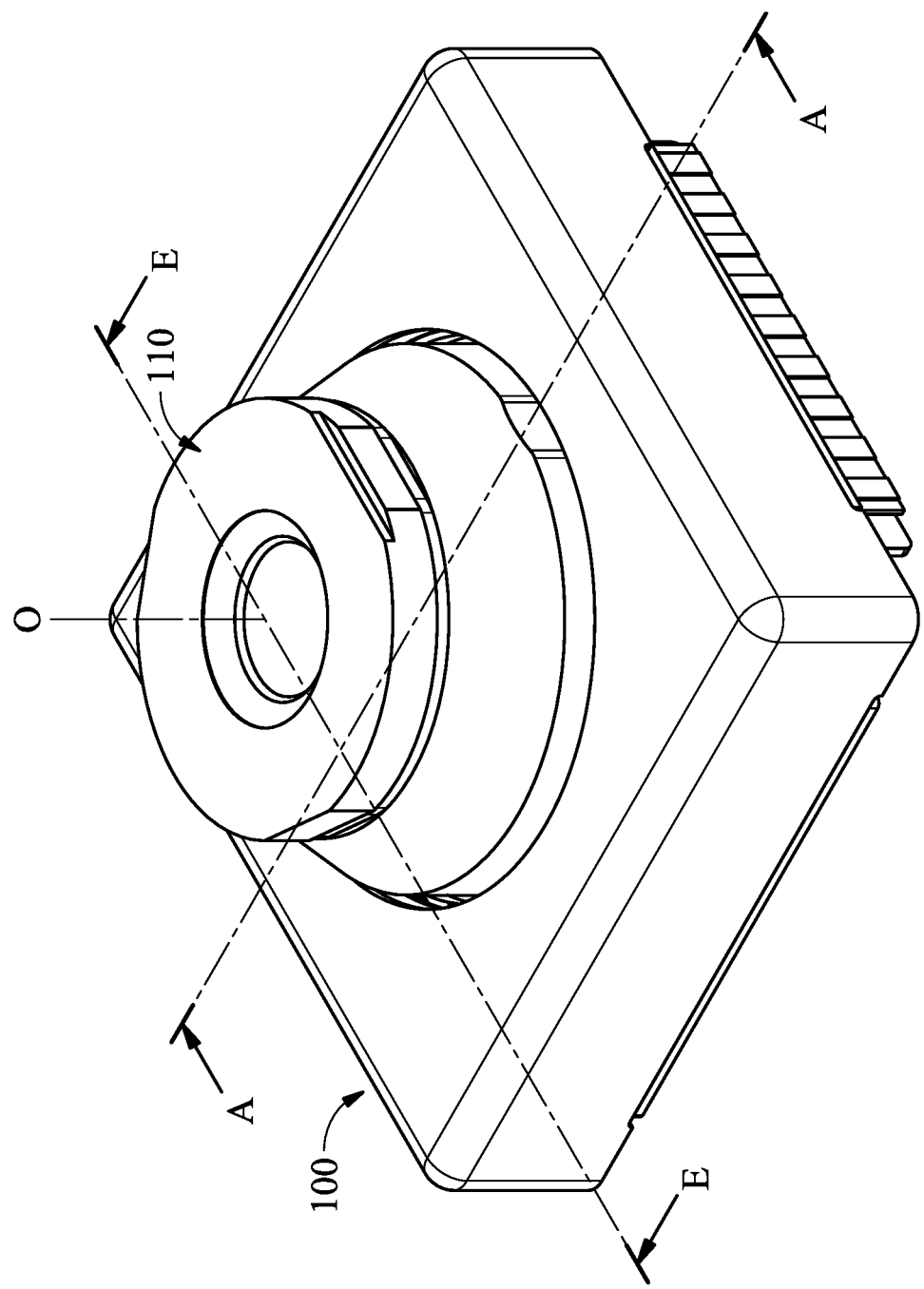
FIG. 1A is a perspective view of an optical element driving mechanism according to the present disclosure.

Firstly, please refer to FIG. 1A, FIG. 1A is a perspective view of an optical element driving mechanism 100 according to an embodiment of the present disclosure. The optical element driving mechanism 100 may carry an optical element 110, and the optical element 110 includes an optical axis O.

Figure 1B:
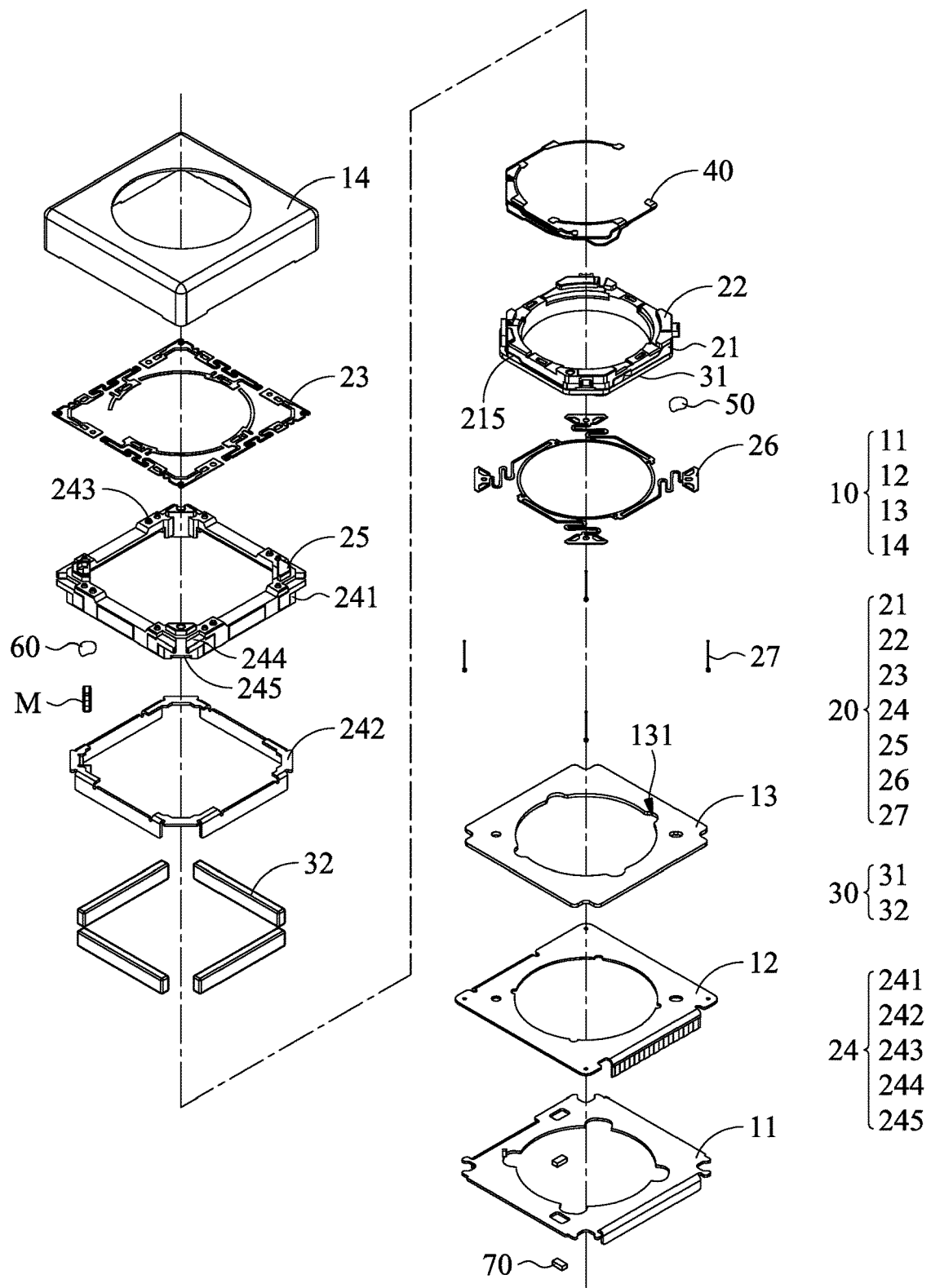
FIG. 1B is an exploded view of the optical element driving mechanism according to the present disclosure.

Please refer to FIG. 1B, FIG. 1B is an exploded view of the optical element driving mechanism 100. The optical element driving mechanism 100 includes a fixed part 10, a movable part 20, a driving assembly 30, a sensing magnet M, a circuit component 40, a damping member 50, adhesive 60 and electronic elements 70.

The fixed part 10 includes a metallic base 11, a circuit plate 12, a flat coil 13 and an outer frame 14. The movable part 20 is movably connected to the fixed part 10 and carries the optical element 110. The movable part 20 includes a holder 21, a holder stopper 22, a first elastic element 23, a frame 24, a frame stop assembly 25, a second elastic element 26 and a third elastic element 27. The driving assembly 30 drives the movable part 20 to move relative to the fixed part 10. The driving assembly 30 includes a driving coil 31 and a driving magnetic element 32.

The metallic base 11 may be made of metals or alloys; alternatively, the metallic base 11 may be made of ferromagnetic metals or ferromagnetic alloys. For example, the metallic base 11 may be made of ferromagnetic metals such as iron, cobalt, nickel and the like or alloys thereof. The metallic base 11 may enhance the structure of the optical element driving mechanism 100 and may ground the optical element driving mechanism 100.

Figure 2A:
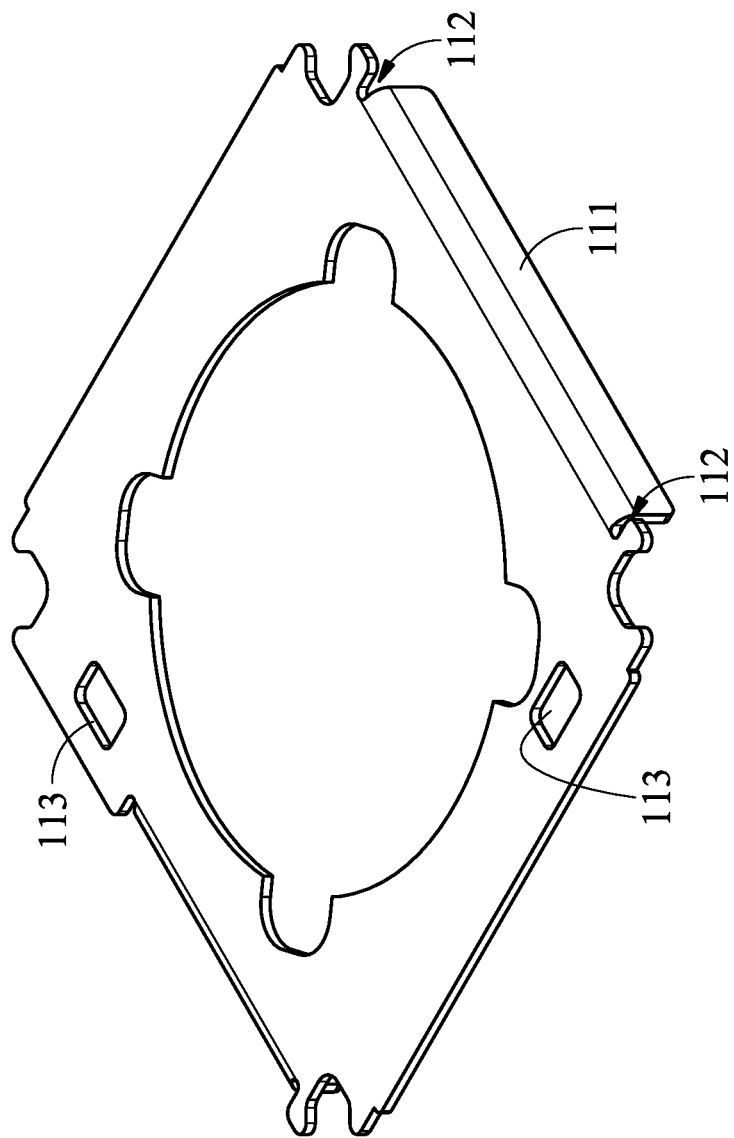
FIG. 2A is a schematic view of a metallic base of the optical element driving mechanism according to the present disclosure.

FIG. 2A is a schematic view of the metallic base 11. As shown in FIG. 2A, the metallic base 11 includes a metallic base side 111, metallic base recesses 112 and a metallic base groove 113. The metallic base recesses 112 are located at two sides of the metallic base side 111.

Figure 2B:
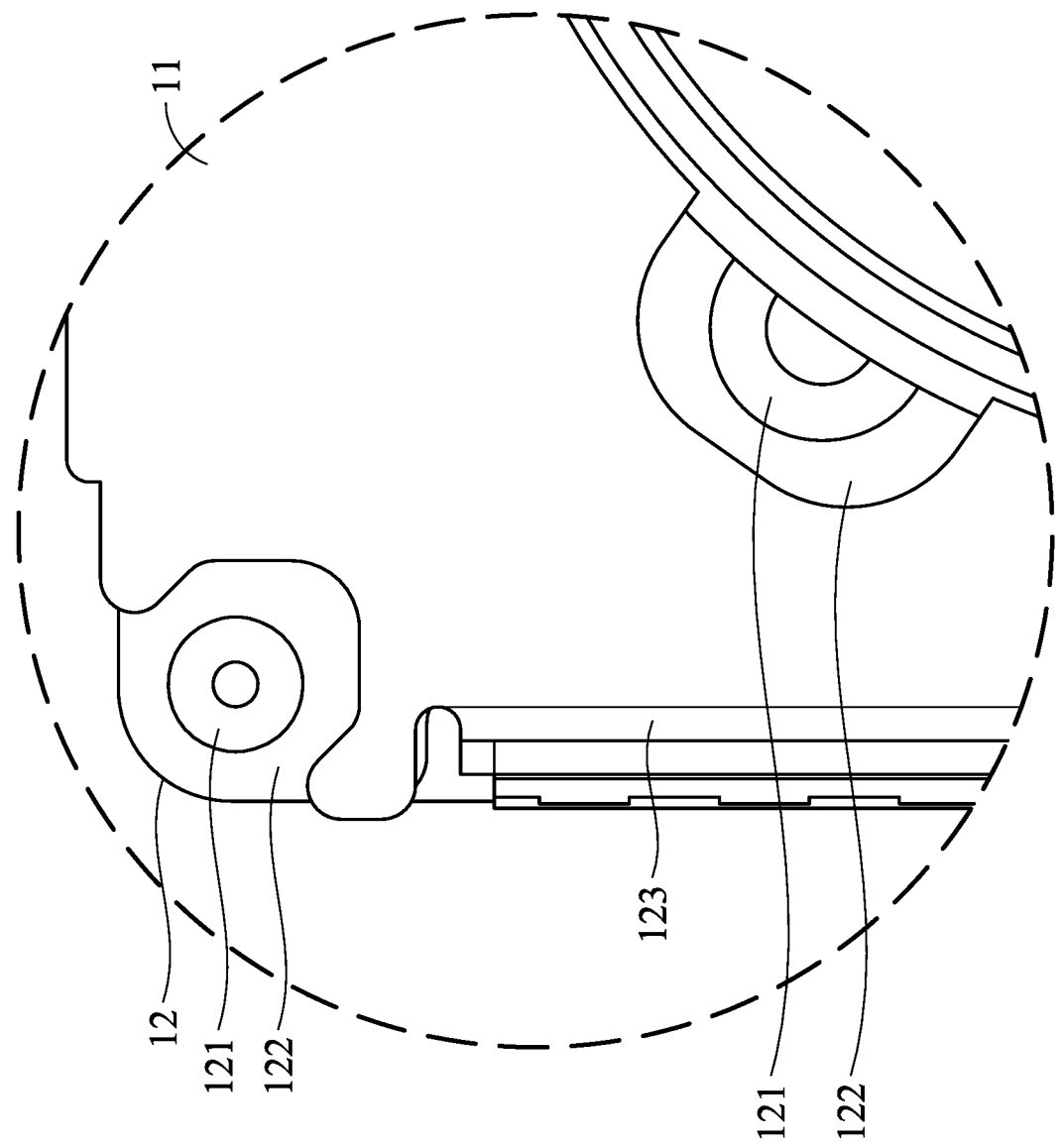
FIG. 2B is a partial bottom view of the optical element driving mechanism according to the present disclosure.

FIG. 2B is a partial bottom view of the optical element driving mechanism 100 according to the present disclosure. As shown in FIG. 2B, the circuit plate 12 is disposed on the metallic base 11, and the circuit plate 12 includes a plate electrical connecting portion 121, an insulated portion 122 and a circuit plate side 123. The insulated portion 122 is disposed between the plate electrical connecting portion 121 and the metallic base 11. The insulated portion 122 may be made of electrical insulation materials, for example, the insulated portion 122 may be made of materials such as rubber, resin, glasses, ceramics and the like. The insulated portion 122 extends from the plate electrical connecting portion 121 toward the metallic base 11 and extends at least 0.05 millimeter to prevent the plate electrical connecting portion 121 and the metallic base 11 from short-circuiting.

Figure 2C:
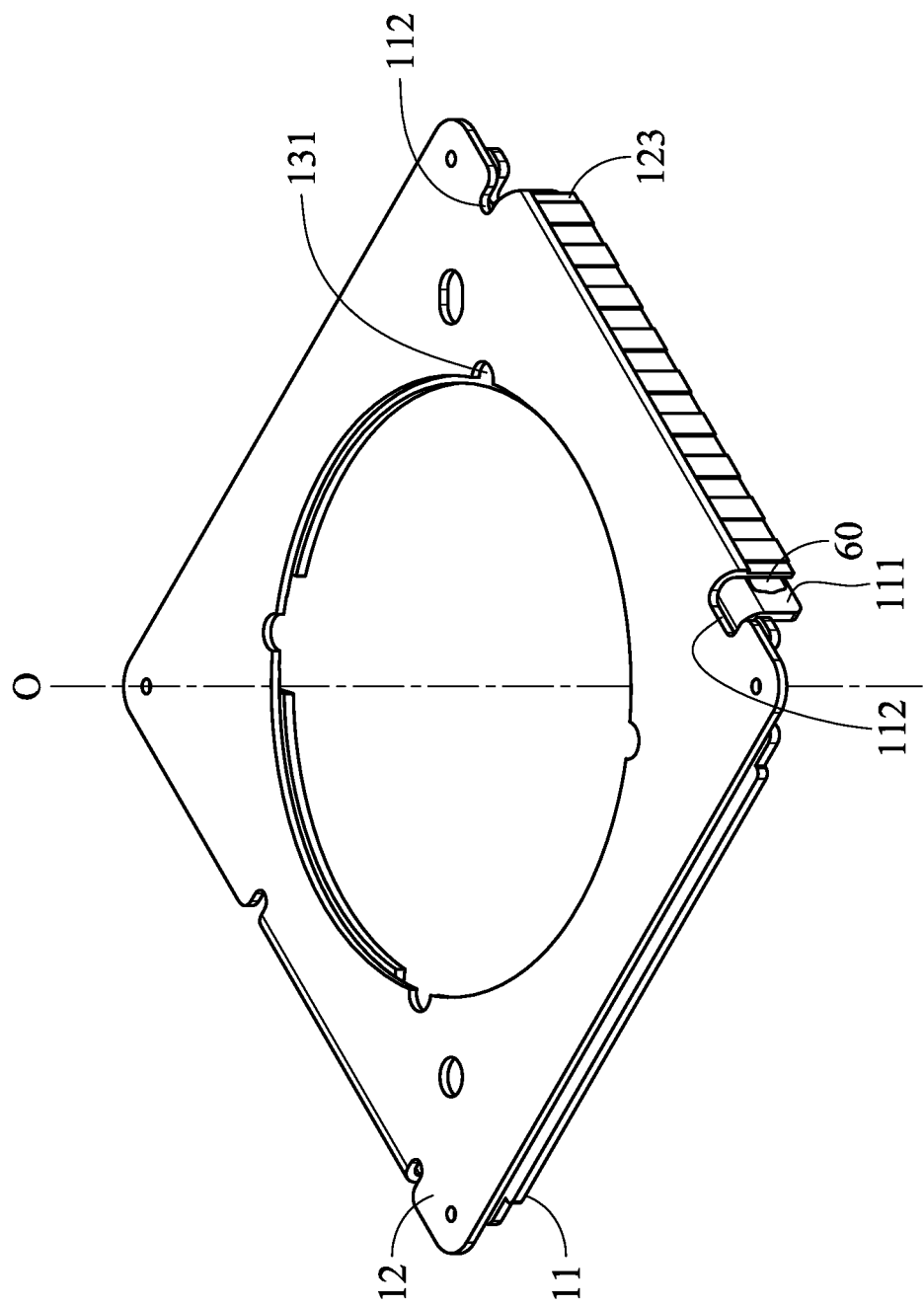
FIG. 2C is a schematic view of the metallic base and a circuit plate of the optical element driving mechanism according to the present disclosure.

Please refer to FIG. 2C, FIG. 2C is a schematic view of the metallic base 11 and a circuit plate 12. The circuit plate side 123 is in contact with the metallic base side 111, and the extending length of the metallic base side 111 in a direction perpendicular to the optical axis O is greater than the extending length of the circuit plate side 123 in the direction perpendicular to the optical axis O to enhance the structure of the circuit plate side 123 and is helpful to manufacture of the optical element driving mechanism 100. Adhesive 60 is provided between the metallic base side 111 and the circuit plate side 123, and the metallic base recesses 112 may accommodate a part of the adhesive 60 to prevent adhesive 60 from flowing to other elements.

Figure 2D:
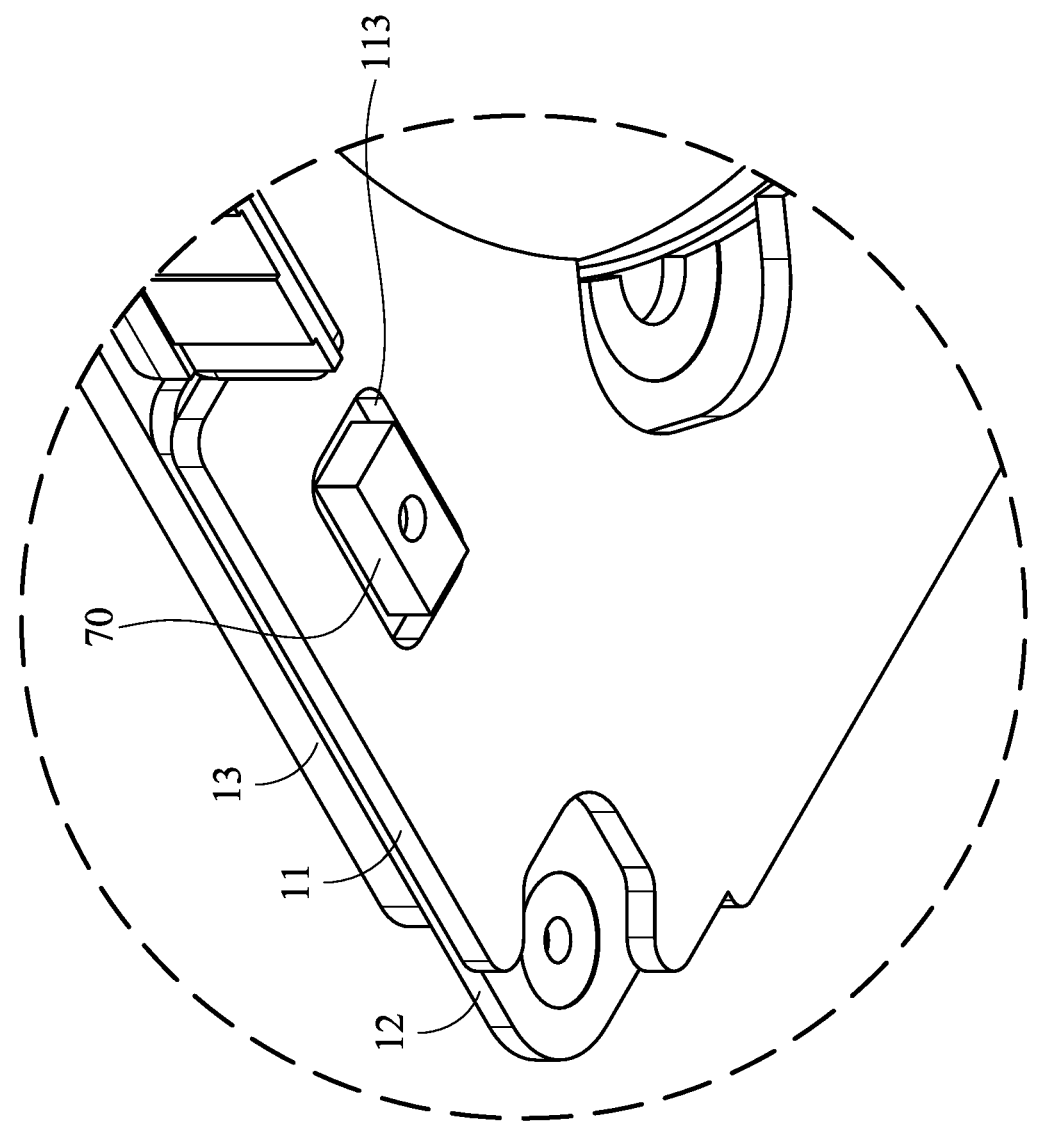
FIG. 2D is a partial view of a fixed part and an electrical element of the optical element driving mechanism according to the present disclosure.

Please refer to FIG. 2D, FIG. 2D is a partial view of the fixed part 10 and the electrical element 70. The electrical element 70 may be disposed on the metallic base groove 113 of the metallic base 11, and the electrical element 70 may be elements such as sensors, filters and the like.

Figure 2E:
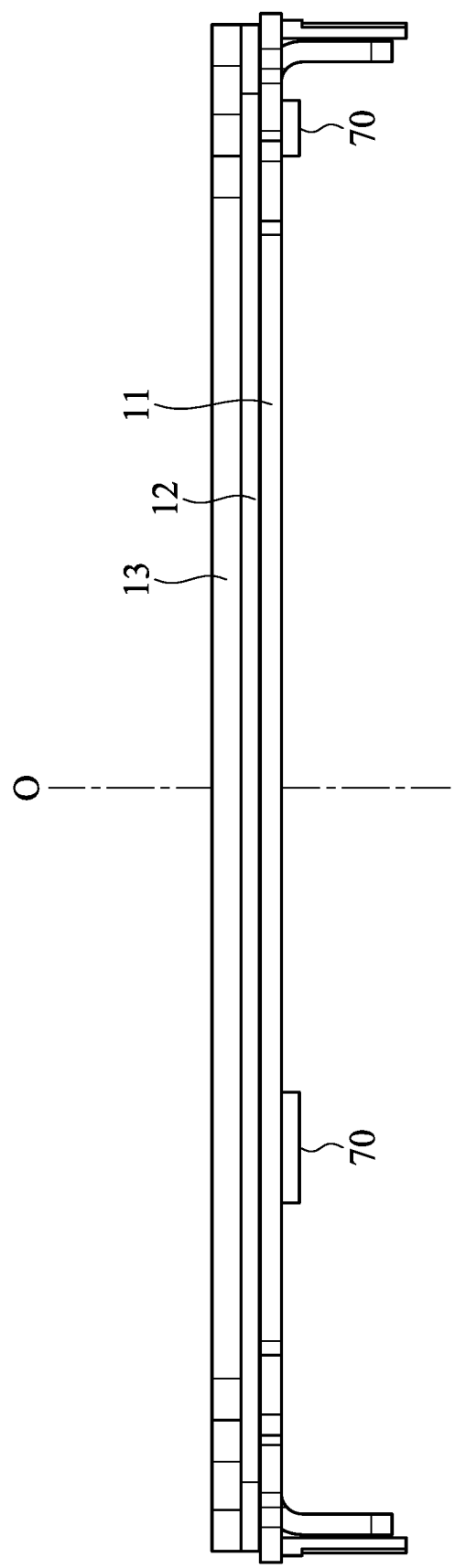
FIG. 2E is a side view of the fixed part and the electrical element of the optical element driving mechanism according to the present disclosure.

Please refer to FIG. 2E, FIG. 2E is a side view of the fixed part 10 and the electrical element 70. A part of the electrical element 70 may be exposed from the metallic base 11 when observed along a direction perpendicular to the optical axis O. Namely, a part of the electrical element 70 may not overlap the metallic base 11 when observed along the direction perpendicular to the optical axis O. Thus, the spatial utilization efficiency is improved and an effect of miniaturization is achieved. Moreover, resin materials may be disposed around the electrical element 70 to enhance the mechanical strength.

Figure 3:
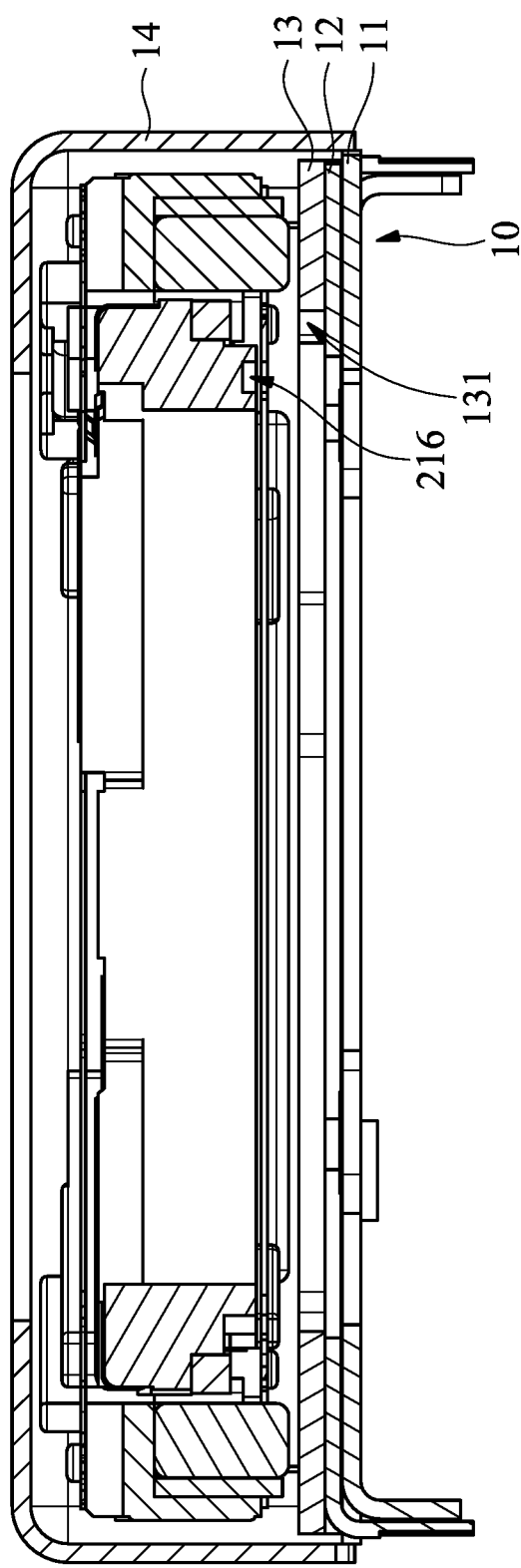
FIG. 3 is a cross-sectional view of the optical element driving mechanism according to the present disclosure along line A-A in FIG. 1A.

Please refer to FIG. 3, FIG. 3 is a cross-sectional view along line A-A in FIG. 1A. The flat coil 13 is disposed on the circuit plate 12, and the flat coil 13 includes dodging grooves 131 (also refer to FIG. 2C). The outer frame 14 is disposed on the metallic base 11. The outer frame 14 may be made of metals to solder or weld with the metallic base 11, and to ground the optical element driving mechanism 100.

Figure 4A:
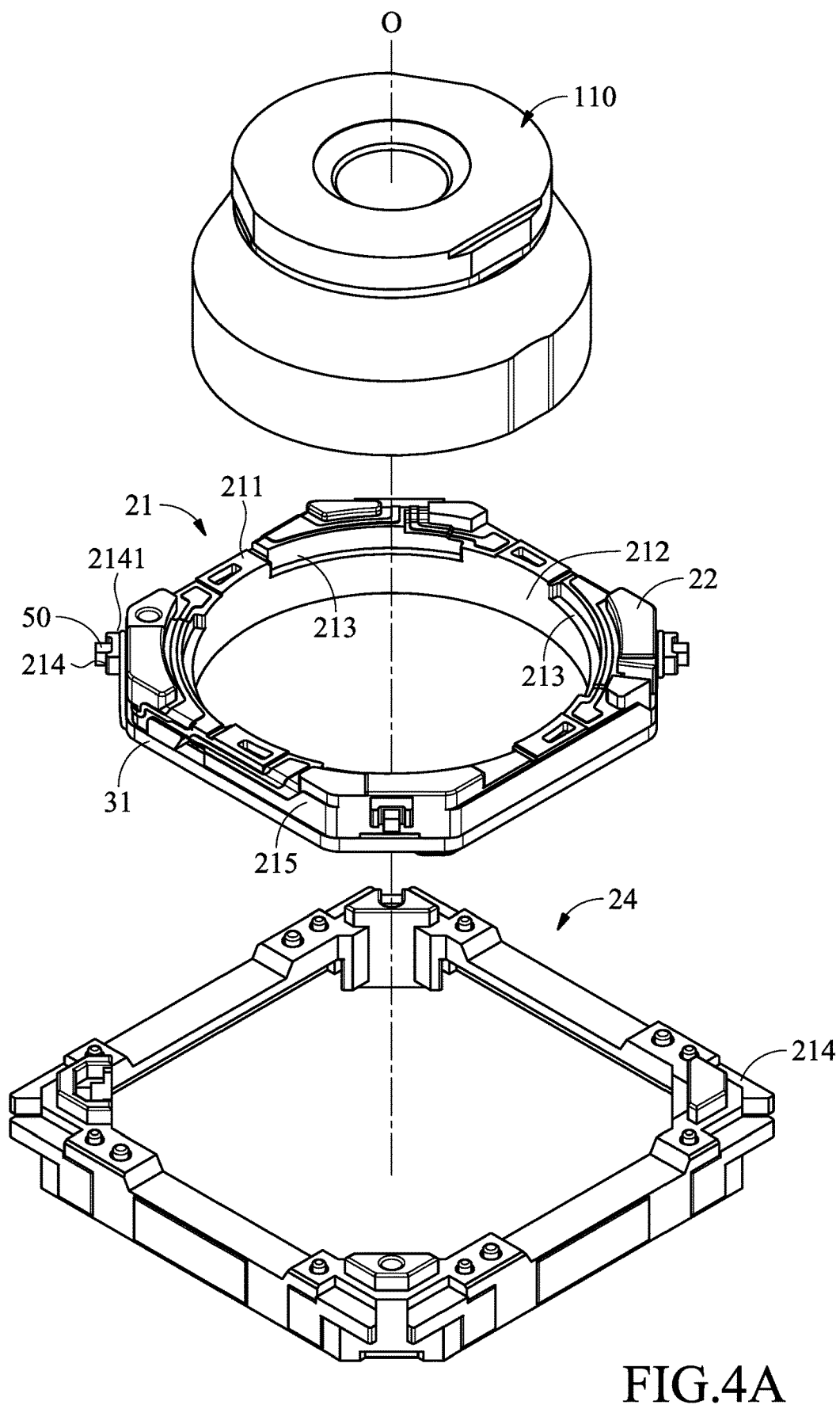
FIG. 4A is a schematic view of the holder of the optical element driving mechanism according to the present disclosure.

FIG. 4A is a schematic view of the holder 21. As shown in FIG. 4A, the holder 21 carries the optical element 110. The holder 21 may include a surface 211, a sidewall 212, a holder groove 213, a protruding portion 214, a stopping portion 215 and a connecting portion 216. The sidewall 212 faces the optical element 110. The holder groove 213 is disposed at the junction of the surface 211 and the sidewall 212. The holder groove 213 can increase the contact area to improve the connection effect when the holder 21 is combined with the optical element 110. The protruding portion 214 includes a narrow section 2141. The stopping portion 215 faces away from the sidewall 212. The holder stopper 22 is disposed on the surface 211 of the holder 21, and the holder stopper 22 protrudes from the surface 211 along the optical axis O to limit a range of motion of the holder 21.

A part of the driving coil 31 of the driving assembly 30 is in contact with the protruding portion 214 to fix the driving coil 31. For example, the narrow portion 2141 of the protruding portion 214 may contact and accommodate a part of the driving coil 31 to fix the driving coil 31. The driving coil 31 is disposed on the holder 21. A part of the driving coil 31 is in contact with the stopping portion 215, and the stopping portion 215 is provided with connecting points to enhance the connection of the driving coil 31 and the stopping portion 215, and the difficulty of tracing of the driving coil 31 may be reduced.

Figure 4B:
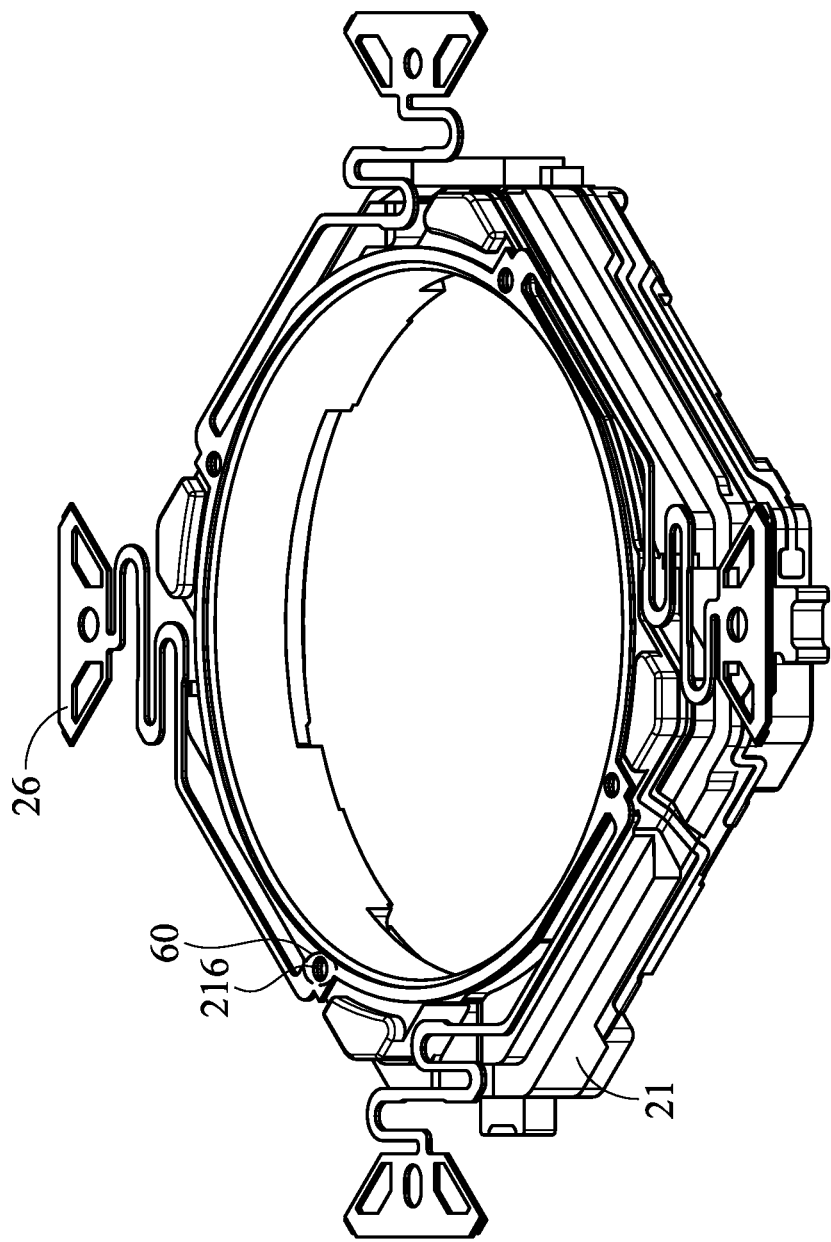
FIG. 4B is a bottom view of a holder and a second elastic element of the optical element driving mechanism according to the present disclosure.

FIG. 4B is a bottom view of the holder 21 and the second elastic element 26. As shown in FIG. 4B, the connecting portion 216 (also refer to FIG. 3) is disposed on the holder 21, and the connecting portion 216 may by recesses on the holder 21. The connecting portion 216 is corresponding to the dodging grooves 131, and the connecting portion 216 is provided with the adhesive 60 to fix the second elastic element 26. The adhesive 60 may protrude from the connecting portion 216, the dodging grooves 131 corresponding to the connecting portion 216 may accommodate the adhesive 60 protruding from the connecting portion 216 to prevent damage caused by contact between the adhesive 60 on the connecting portion 216 and the flat coil 13 after connection of the movable part 20.

Figure 4C:
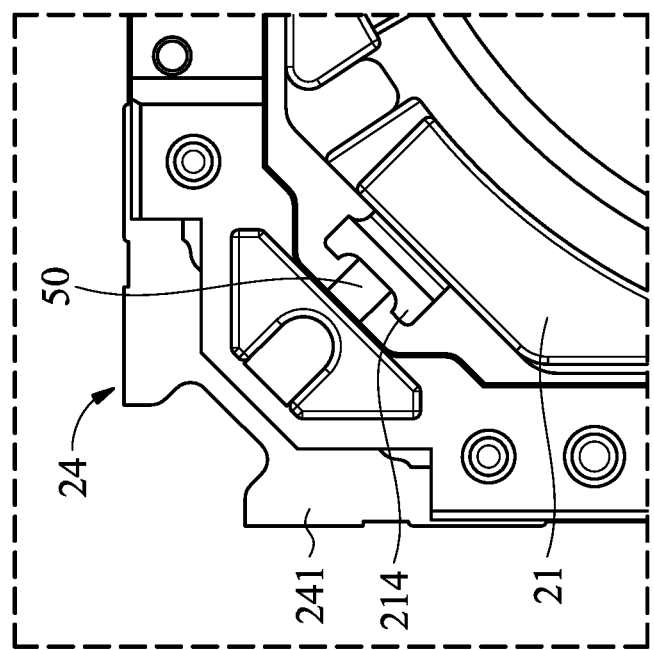
FIG. 4C is a partial view of the holder and a frame body of the optical element driving mechanism according to the present disclosure.

FIG. 4C is a partial view of the holder 21 and the frame body 214. Please refer to FIGS. 4A and 4C. The damping member 50 is disposed at the protruding portion 214 of the holder 21, namely, the driving coil 31 and the damping member 50 may share the protruding portion 214, thereby the spatial utilization efficiency is improved and the effect of miniaturization is achieved. The damping member 50 may prevent damage to the holder 21 and the frame 24 caused by contact when the holder 21 moves relative to the frame body 241. The damping member 50 may be materials such as gel and the like, and the damping member 50 may have an effect of preventing resonance. The damping member 50 is located between the holder 21 and the frame 24 and is in contact with the holder 21 and the frame 24 so that the vibration of the holder 21 may be suppressed, and the effect of preventing resonance is achieved.

Figure 5:
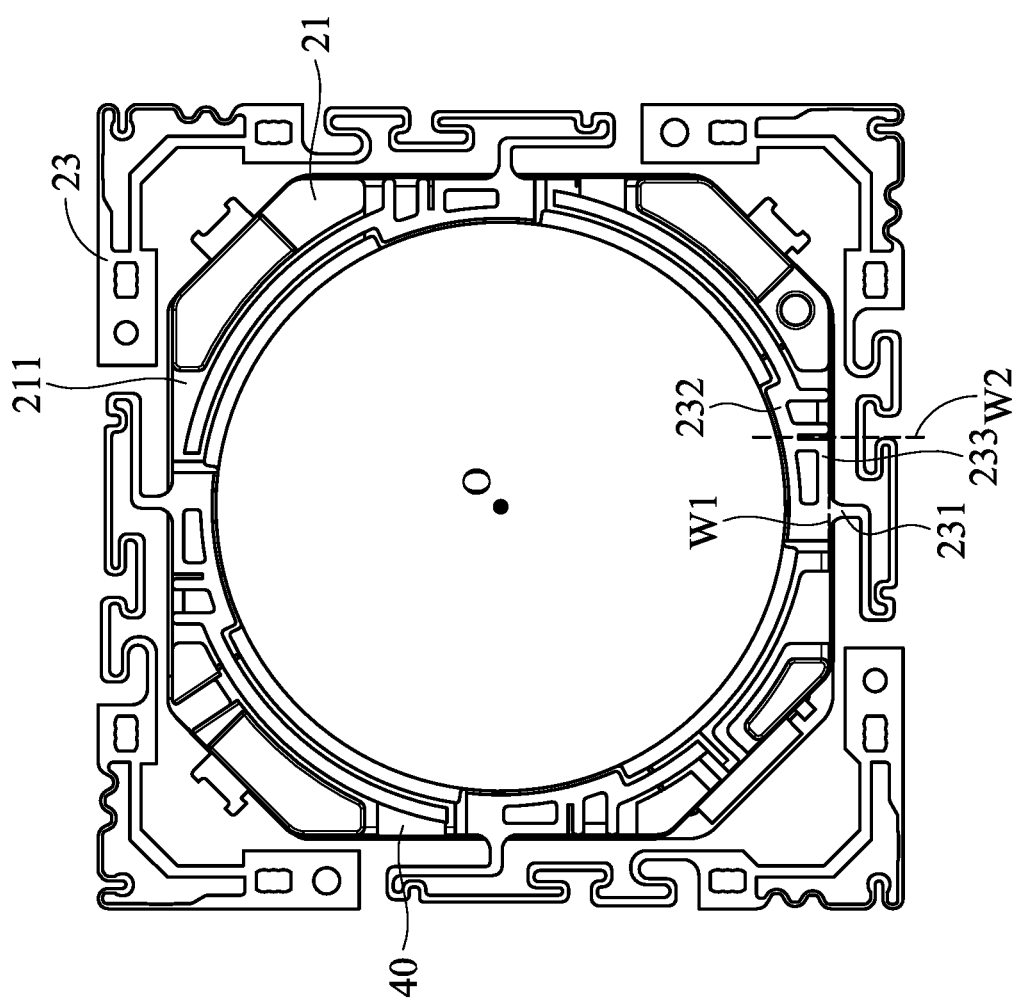
FIG. 5 is a schematic view of the holder and a first elastic element of the optical element driving mechanism according to the present disclosure.

Please refer to FIG. 5, FIG. 5 is a schematic view of the holder 21 and the first elastic element 23. The first elastic element 23 is disposed on the surface 211 of the holder 21 and is flexible along the optical axis O. The first elastic element 23 may be made of electrically conductive materials, for example, the first elastic element 23 may be made of electrically conductive metals or electrically conductive alloys. For example, the first elastic element 23 may be made of electrically conductive metals such as silver, copper, gold, aluminum, tungsten, iron, titanium, and the like, or the alloys thereof. The circuit component 40 is disposed on the holder 21, and the circuit component 40 partially overlaps the first elastic element 23 when observed along the direction of the optical axis O. Thus, the electrical contact area of the circuit component 40 is increased, the damage to the circuit component 40 may be prevented, the resistance is reduced, and noise immunity is achieved.

The first elastic element 23 includes a string connection portion 231, an electrical connection portion 232 and a holder connection portion 233. As shown in FIG. 5, the boundary between the string connection portion 231 and the holder connection portion 233 is a dashed line W1, and the boundary between the electrical connection portion 232 and the holder connection portion 233 is a dashed line W2. The string connection portion 231 is elastically flexible along the optical axis O. The electrical connection portion 232 is connected to the holder 21. The holder connection portion 233 is located between the string connection portion 231 and the electrical connection portion 232 and connected to the holder 21 so that when the string connection portion 231 flexes, the string connection portion 231 may be prevented from pulling the electrical connection portion 232, and the reliability of the optical element driving mechanism 100 is improved.

Figure 6:
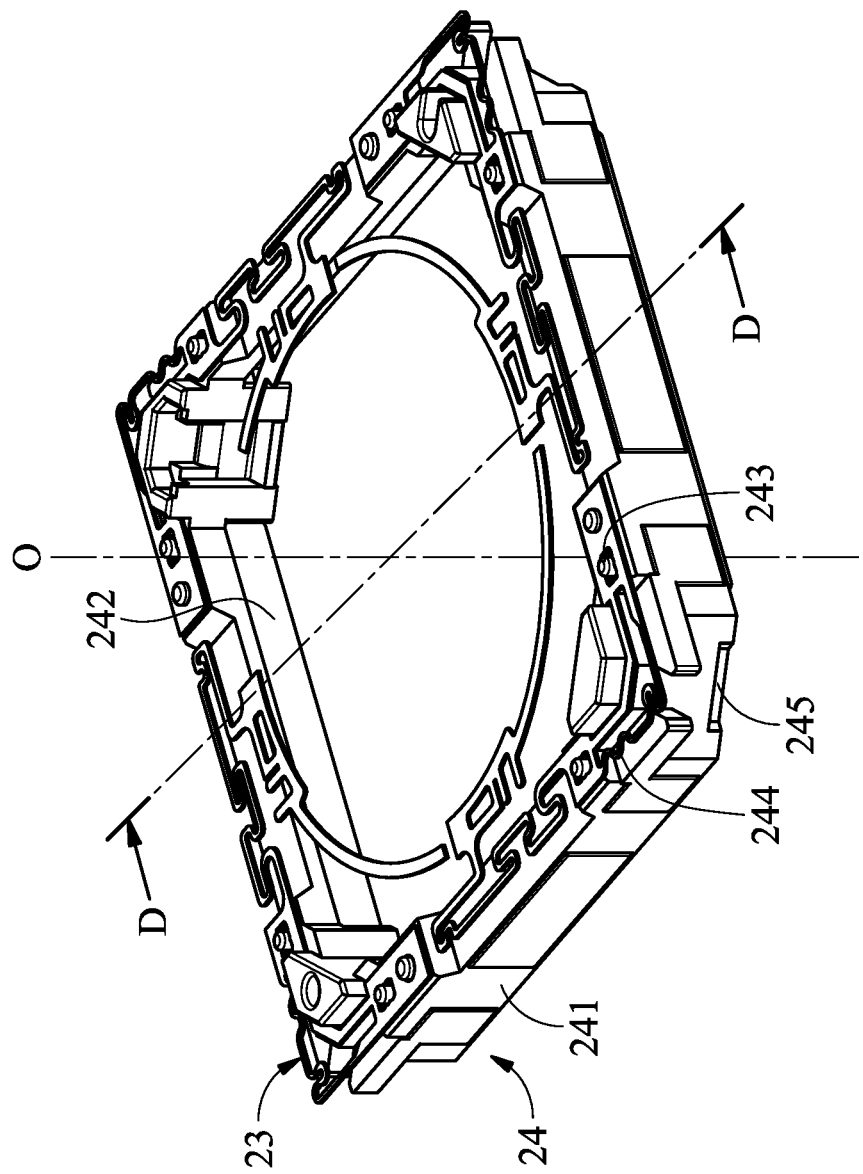
FIG. 6 is a schematic view of the first elastic element and a frame of the optical element driving mechanism according to the present disclosure.

FIG. 6 is a schematic view of the first elastic element 23 and the frame 24. As shown in FIG. 6, the frame 24 is connected to the first elastic element 23. The frame 24 includes a frame body 241, a metallic framework 242, a positioning assembly 243, a first groove 244 and a second groove 245. The frame body 241 is connected to the first elastic element 23. The positioning assembly 243 is disposed on the frame body 241, protrudes along the optical axis O, and fixes the first elastic element 23.

Figure 7:
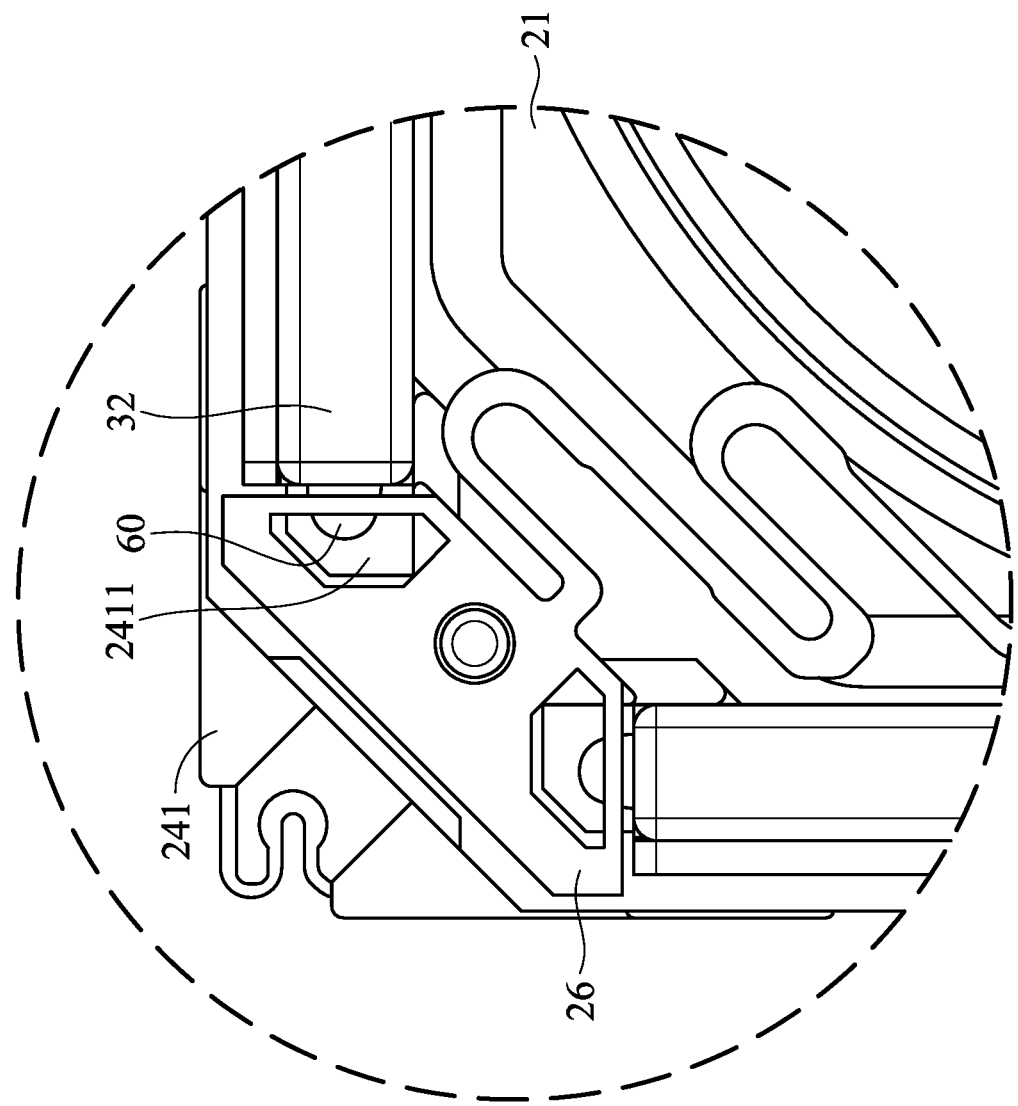
FIG. 7 is a partial bottom view of the optical element driving mechanism according to the present disclosure.

FIG. 7 is a partial bottom view of the optical element driving mechanism 100. As shown in FIG. 7, the frame body 241 is elastically connected to the holder 21. The frame body 241 includes a frame groove 2411, the frame groove 2411 is disposed adjacent to the second elastic element 26. The second elastic element 26 is fixed to the frame body 241 and is flexible along the optical axis O (not shown in FIG. 7). The driving magnetic element 32 is disposed adjacent to the frame groove 2411, namely, the frame groove 2411 is adjacent to the second elastic element 26 and the driving magnetic element 32. Thus, during adhering, the second elastic element 26 and the driving magnetic element 32 may adhere to the frame body 241, and the spatial utilization efficiency is improved and the effect of miniaturization is achieved. The adhesive 60 is disposed in the frame groove 2411 of the frame body 241 to fixedly adhere to the second elastic element 26 and the driving magnetic element 32 to the frame body 241.

Figure 8:
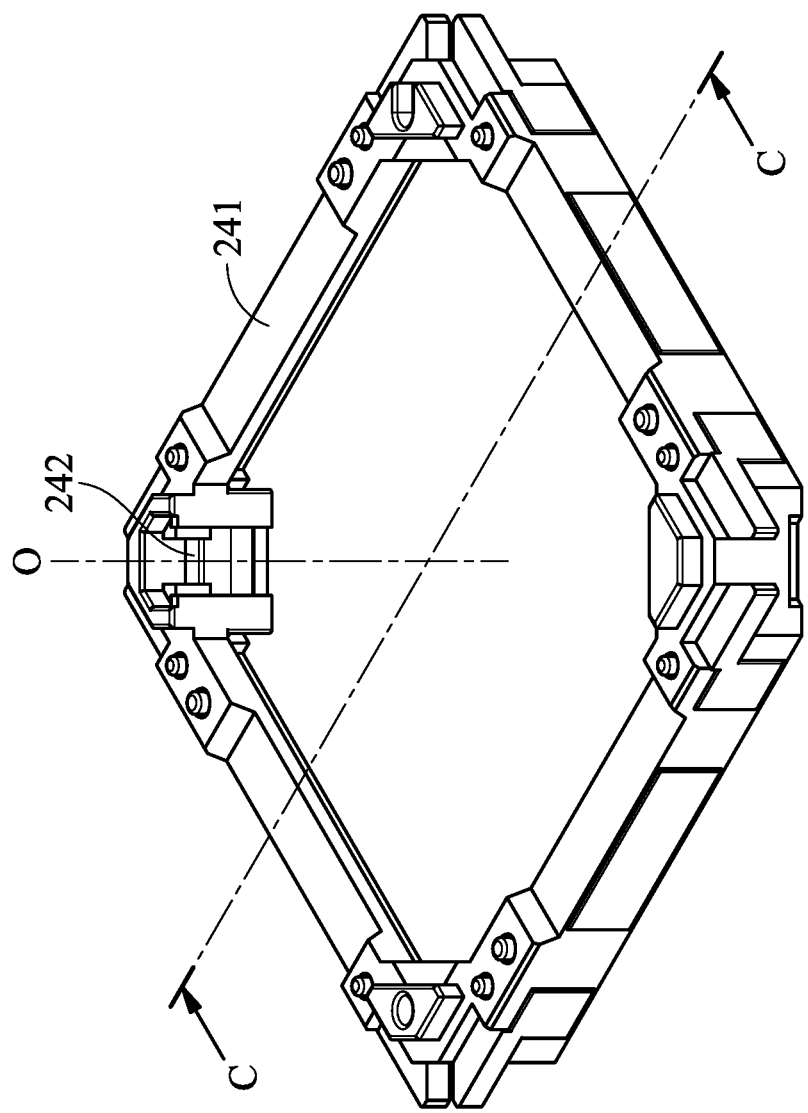
FIG. 8 is a schematic view of the frame body and a metallic framework of the optical element driving mechanism according to the present disclosure.

Please refer to FIG. 8, FIG. 8 is a schematic view of the frame body 241 and the metallic framework 242. The metallic framework 242 is disposed in the frame body 241 to enhance the mechanical strength of the frame body 241. Most of the metallic framework 242 may be covered by the frame body 241, namely, most of the metallic framework 242 is not exposed from the frame body 241 when observed along the optical axis O. Please refer to FIG. 9A to FIG. 10B, in other embodiments, when observed along the optical axis O, a part of the metallic framework 242 may be covered by the frame body 241, and the other part of the metallic framework 242 may be exposed from the frame body 241.

Figure 9A:
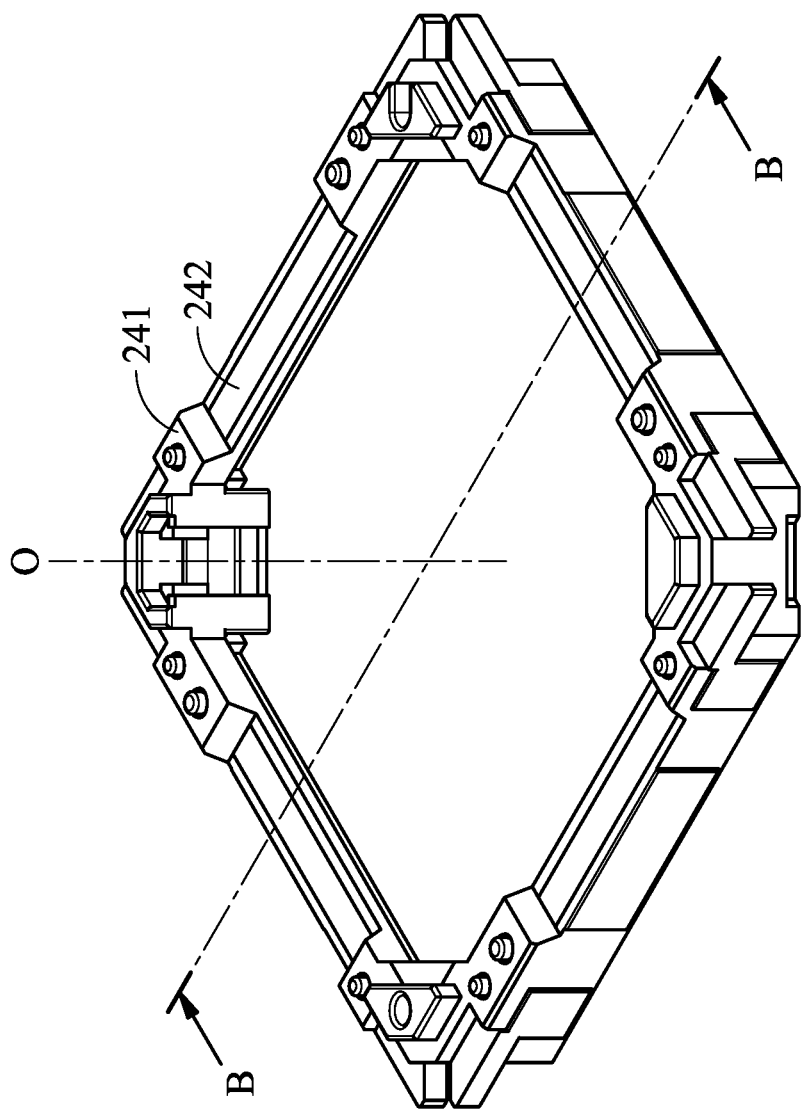
FIG. 9A is a schematic view of the frame body and the metallic framework of the optical element driving mechanism according to the present disclosure.
Figure 9B:
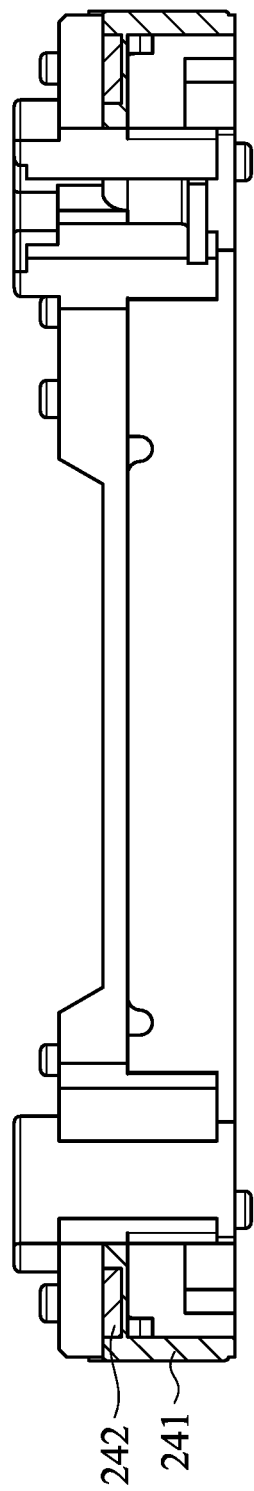
FIG. 9B is a cross-sectional view of the optical element driving mechanism according to the present disclosure along line B-B in FIG. 9A.

FIG. 9A is a schematic view of the frame body 241 and the metallic framework 242 according to an embodiment of the present disclosure. FIG. 9B is a cross-sectional view along line B-B in FIG. 9A. As shown in FIGS. 9A and 9B, in other embodiments, when observed along the optical axis O, an upper part of the metallic framework 242 may be covered by the frame body 241, and the other upper part of the metallic framework 242 may be exposed from the frame body 241. Thus, the height of the optical element driving mechanism 100 is reduced, and the effect of miniaturization is achieved.

Figure 10A:
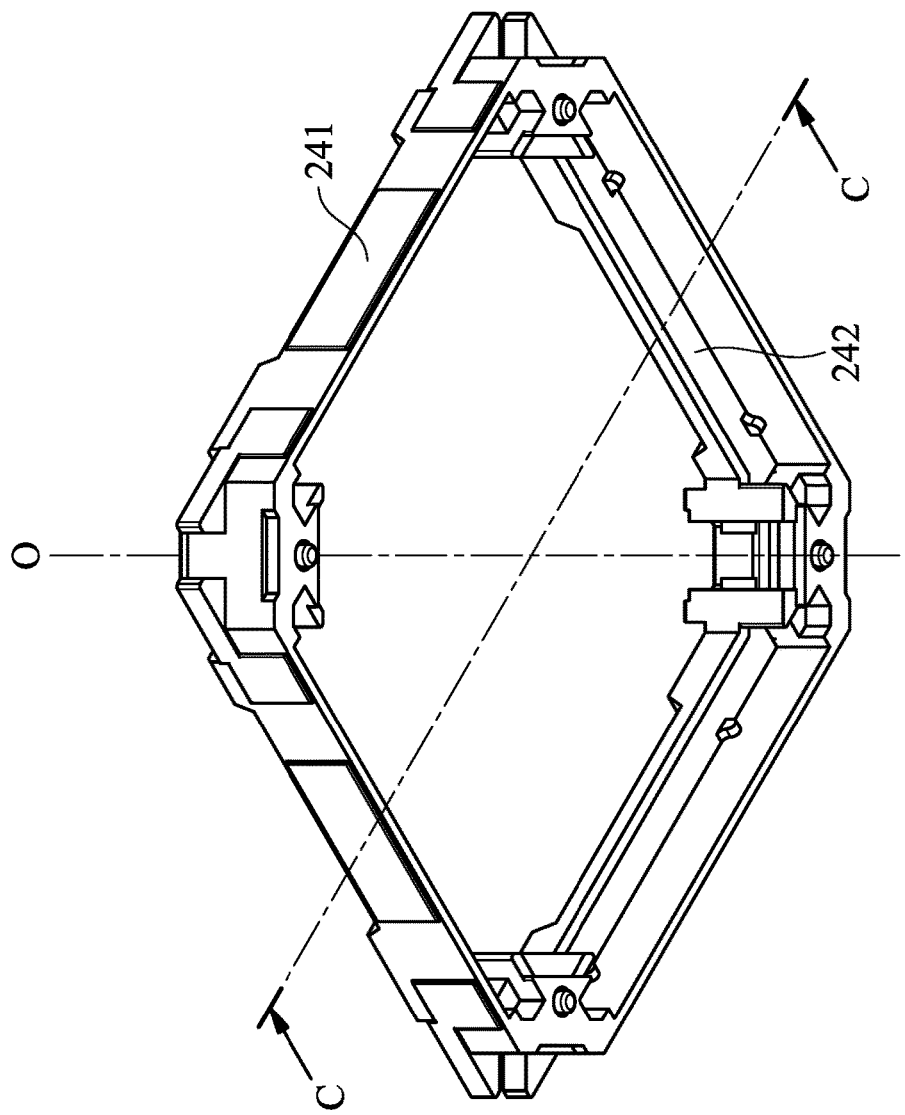
FIG. 10A is a schematic view of the frame body and the metallic framework of the optical element driving mechanism according to the present disclosure.
Figure 10B:
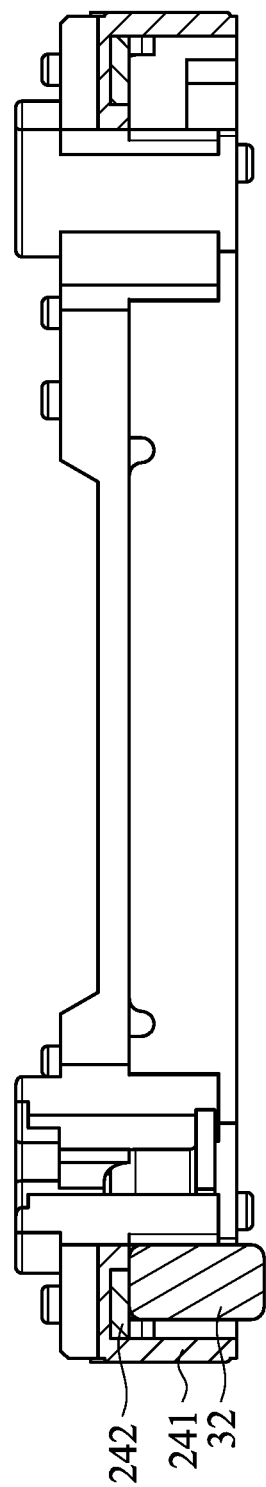
FIG. 10B is a cross-sectional view of the optical element driving mechanism according to the present disclosure along line C-C in FIG. 10A.

FIG. 10A is a schematic view of the frame body 241 and the metallic framework 242 according to an embodiment of the present disclosure. FIG. 10B is a cross-sectional view along line C-C in FIG. 10A. As shown in FIGS. 10A and 10B, in other embodiments, when observed along the optical axis O, a lower part of the metallic framework 242 may be covered by the frame body 241, and the other lower part of the metallic framework 242 may be exposed from the frame body 241.

In other embodiments, when observed along the optical axis O, an upper part of the metallic framework 242 may be covered by the frame body 241, and the other upper part of the metallic framework 242 may be exposed from the frame body 241. Moreover, when observed along the optical axis O, a lower part of the metallic framework 242 may be covered by the frame body 241, and the other lower part of the metallic framework 242 may be exposed from the frame body 241. Namely, an upper part of the metallic framework 242 and a lower part of the metallic framework 242 are both exposed from the frame body 241. Thus, the height of the optical element driving mechanism 100 is further reduced, and the effect of miniaturization is achieved.

Figure 11A:
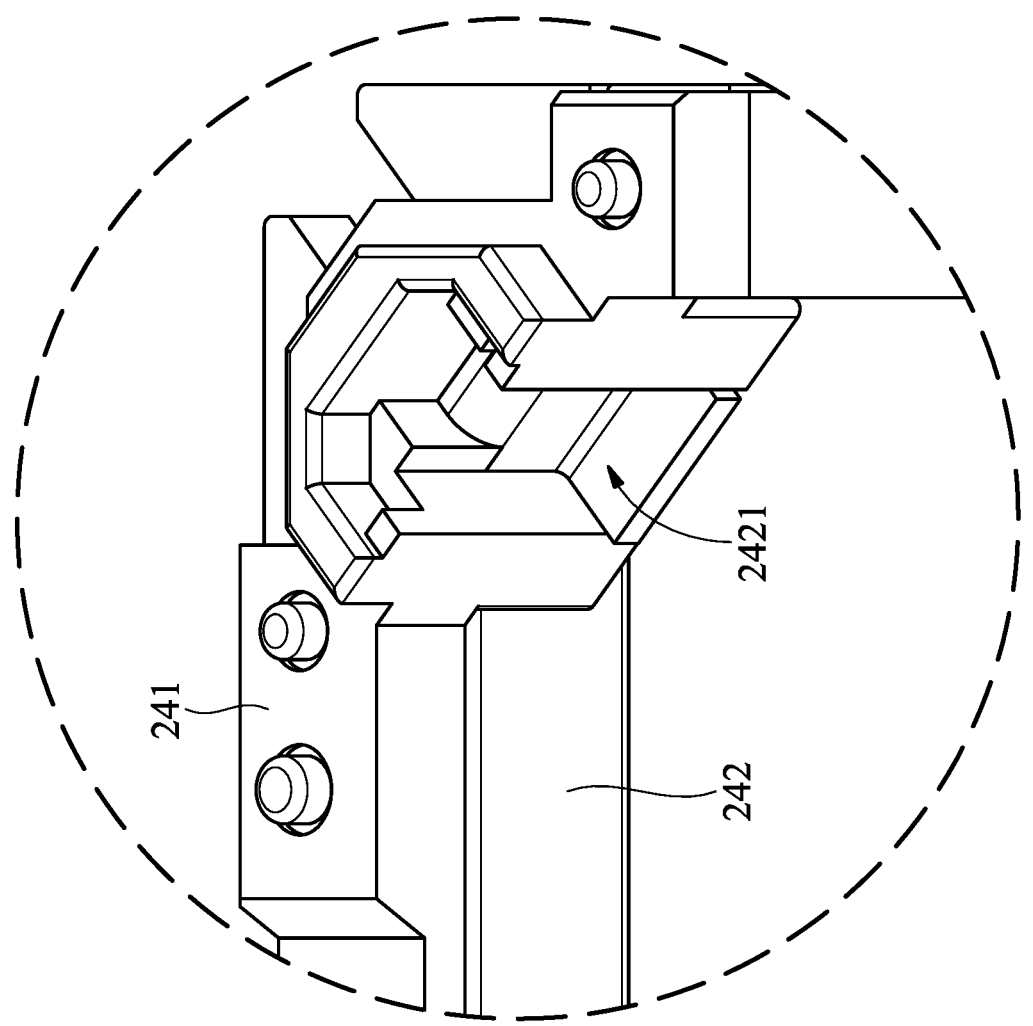
FIG. 11A is a schematic view of an accommodation portion of the optical element driving mechanism according to the present disclosure.
Figure 11B:
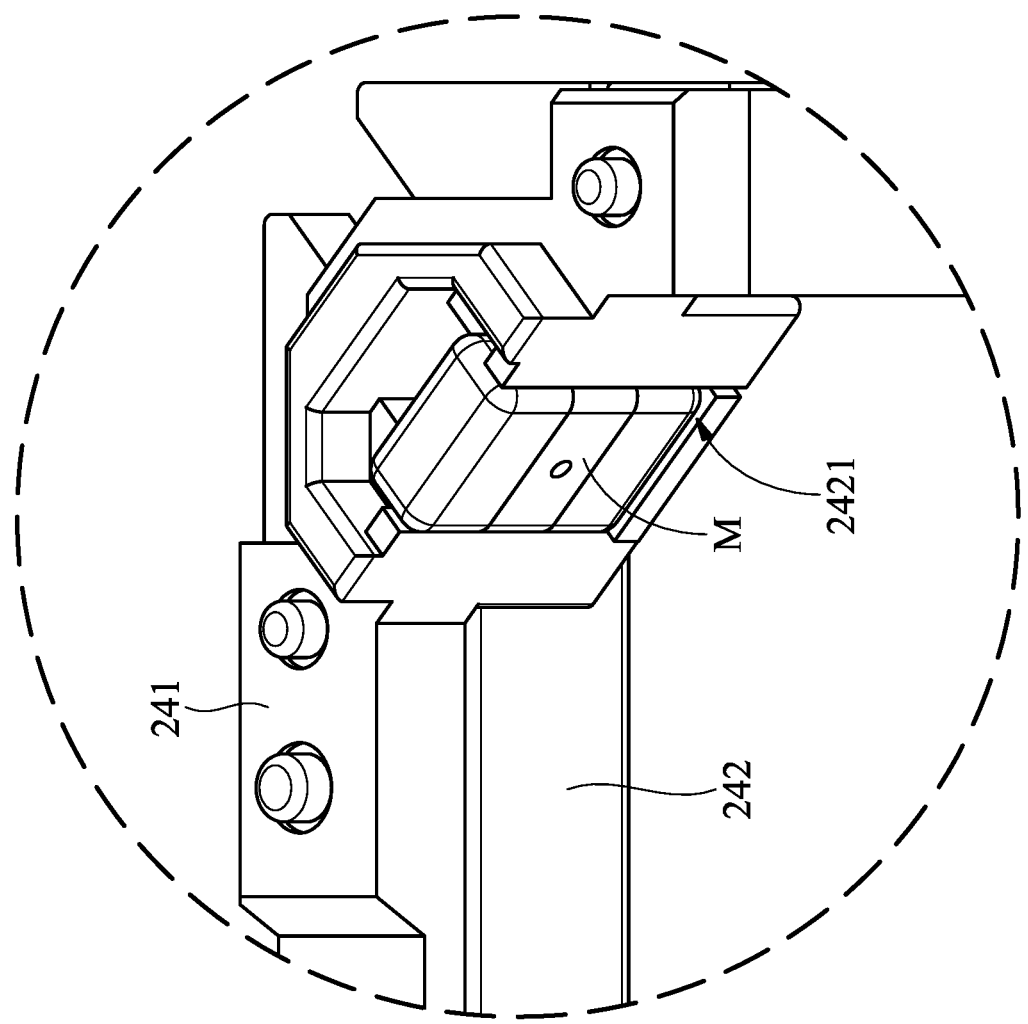
FIG. 11B is a schematic view of the accommodation portion and a sensing magnet of the optical element driving mechanism according to the present disclosure.

FIG. 11A is a schematic view of an accommodation portion 2421 (the sensing magnet M is not shown). FIG. 11B is a schematic view of the accommodation portion 2421 and the sensing magnet M. As shown in FIG. 11A, the metallic framework 242 includes an accommodation portion 2421, and a part of the accommodation portion 2421 is exposed from the frame body 241. As shown in FIG. 11B, the sensing magnet M may be disposed at the accommodation portion 2421, and the sensing magnet M may be positioned. The sensing magnet M may be partially exposed from the frame body 241 to improve the sensing accuracy. The sensing magnet M may be a permanent magnet, and the accommodation portion 2421 exposed from the frame body 241 may concentrate the magnetic force of the sensing magnet M.

Figure 12:
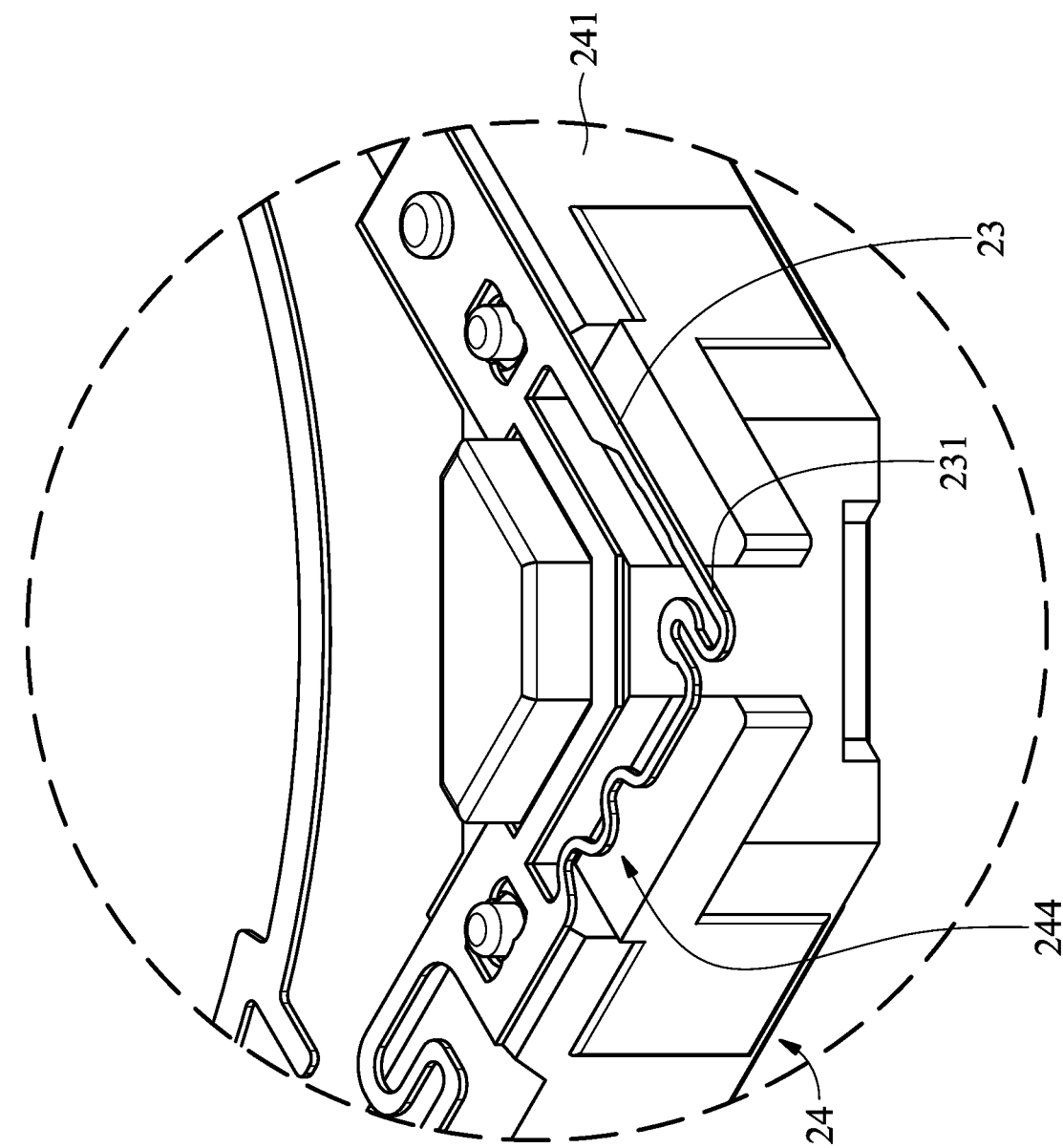
FIG. 12 is a partial view of the first elastic element and the frame of the optical element driving mechanism according to the present disclosure.

Please refer to FIG. 12, FIG. 12 is a partial view of the first elastic element 23 and the frame 24. The first groove 244 may accommodate a part of the first elastic element 23 (such as the string connection portion 231 of the first elastic element 23) to prevent damage caused by contact between the first elastic element 23 and the frame body 241 when the optical element driving mechanism 100 is subject to impact and after the first elastic element 23 is flexed.

Figure 13:
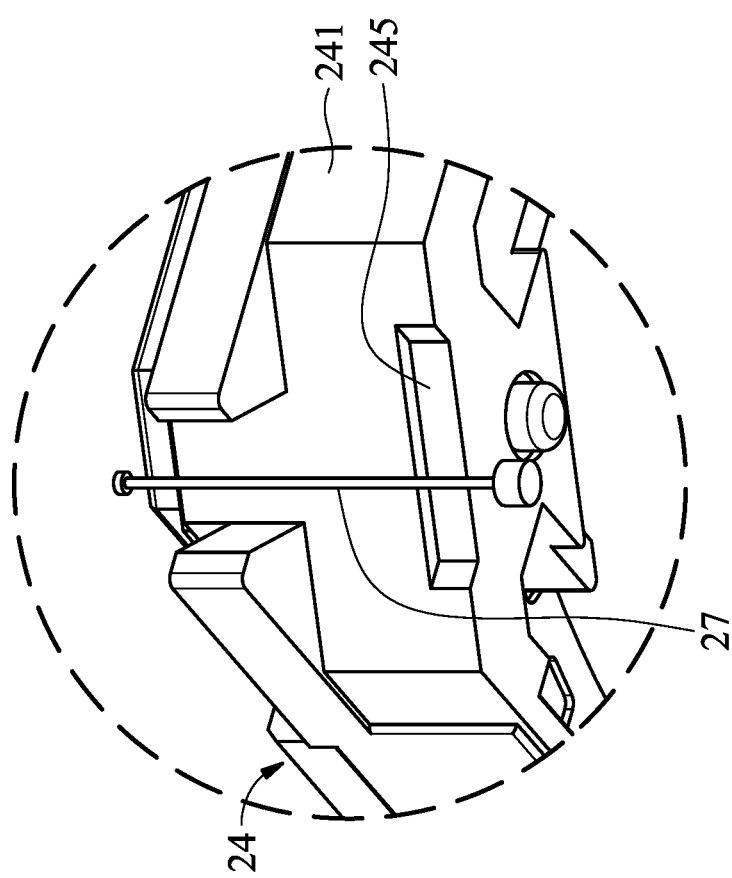
FIG. 13 is a partial view of the frame and a third elastic element of the optical element driving mechanism according to the present disclosure.

Please refer to FIG. 13, FIG. 13 is a partial view of the frame 24 and the third elastic element 27. The second groove 245 may accommodate a part of the third elastic element 27 (such as the second groove 245 may accommodate a lower part of the third elastic element 27) to prevent damage caused by contact between the frame body 241 and the third elastic element 27 when the optical element driving mechanism 100 is subject to impact or when the frame body 241 moves.

Figure 14:
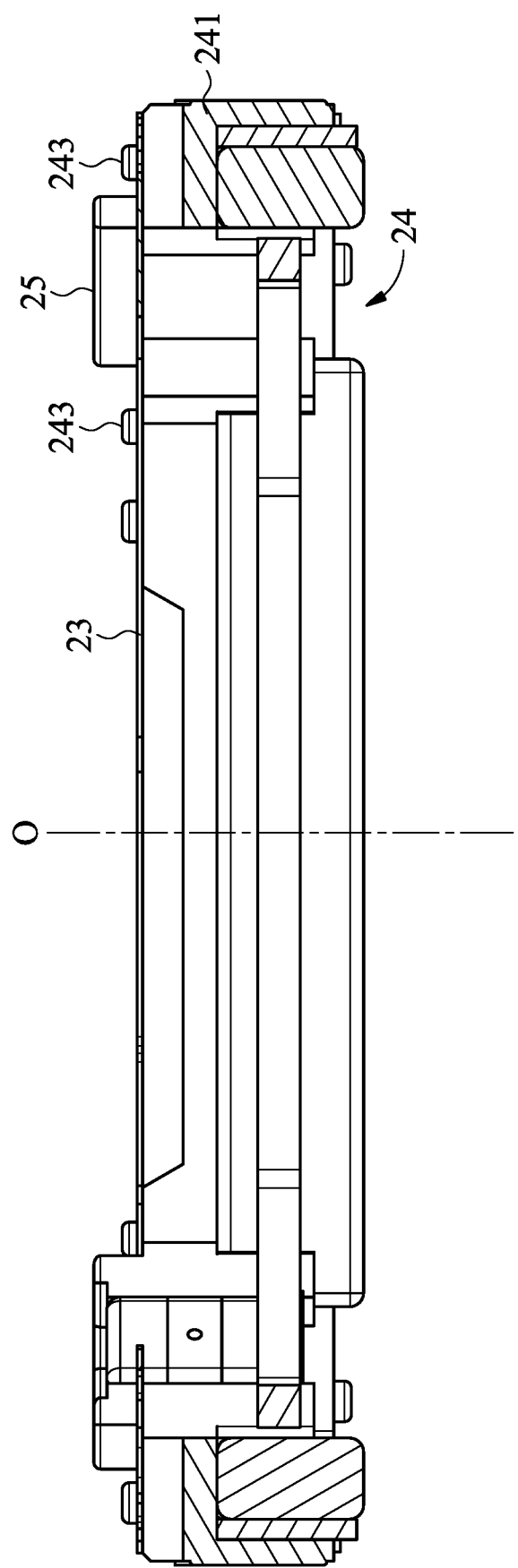
FIG. 14 is a cross-sectional view of the optical element driving mechanism according to the present disclosure along line D-D in FIG. 6.

Please refer to FIG. 14, FIG. 14 is a cross-sectional view along line D-D in FIG. 6. The frame stop assembly 25 is disposed on the frame body 241 and protrudes along the optical axis O. The frame stop assembly 25 limits a range of motion of the movable part 20. A length of the frame stop assembly 25 in the direction of the optical axis O is greater than a length of the positioning assembly 243 in the direction of the optical axis O so that the positioning assembly 243 is protected against damage caused by contact when the frame body 241 moves.

Figure 15:
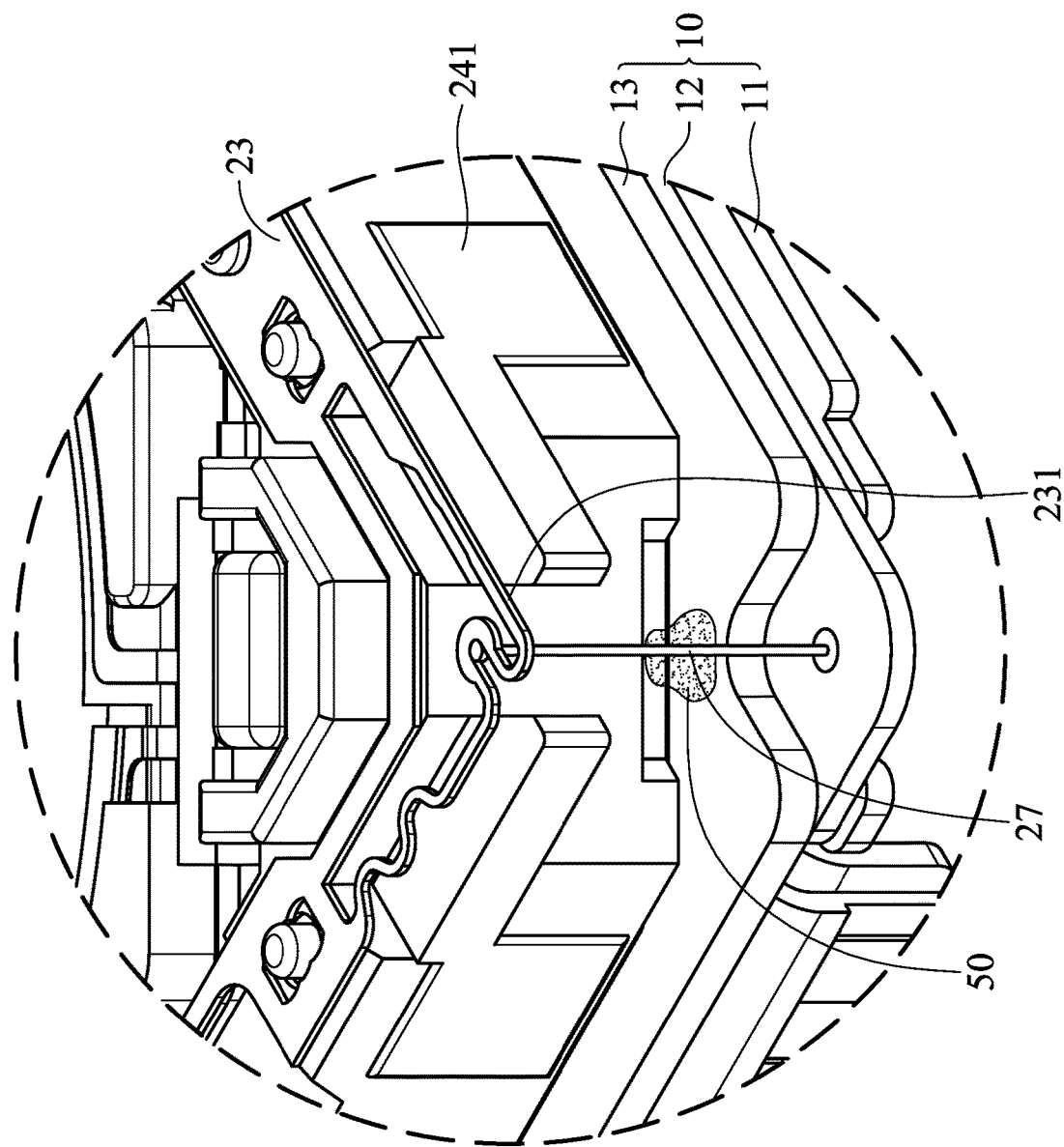
FIG. 15 is a partial view of the fixed part and the movable part of the optical element driving mechanism according to the present disclosure.

FIG. 15 is a partial view of the fixed part 10 and the movable part 20. As shown in FIG. 15, the third elastic element 27 is movably connected to the fixed part 10, and the third elastic element 27 is connected to the string connection portion 231 of the first elastic element 23. The damping member 50 is also disposed between the flat coil 13 and the frame body 241. The damping member 50 may prevent damage to the frame body 241 and the flat coil 13 caused by contact when the frame body 241 moves relative to the flat coil 13. The damping member 50 may suppress the vibration of the movable part 10, and the effect of preventing resonance is achieved.

Figure 16:
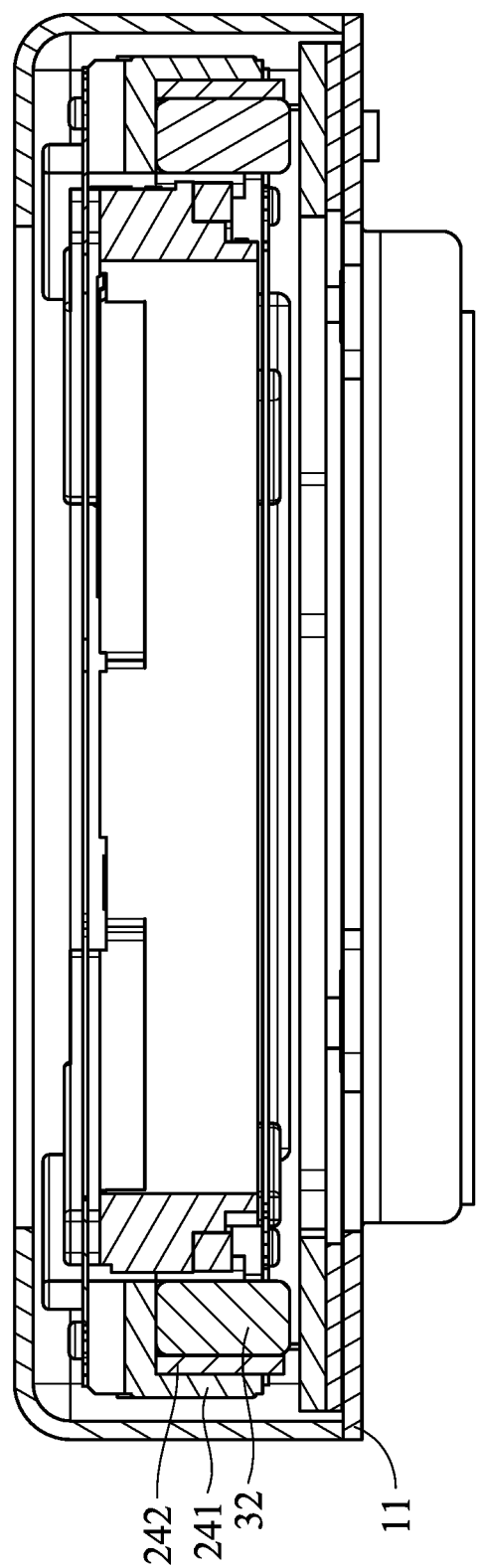
FIG. 16 is a cross-sectional view of the optical element driving mechanism according to the present disclosure along line E-E in FIG. 1A.

Please refer to FIG. 16, FIG. 16 is a cross-sectional view along line E-E in FIG. 1A. The driving magnetic element 32 is disposed on the frame body 241, and the frame body 241, the metallic framework 242 and the driving magnetic element 32 are disposed in a sequence to prevent damage caused by contact of the frame body 241 and other elements. For example, the metallic framework 242 may be located between the frame body 241 and the driving magnetic element 32, and the driving magnetic element 32 is closer to the metallic base 11 than the frame body 241 and the metallic framework 242. The driving magnetic element 32 may be a permanent magnet, the metallic framework 242 may concentrate lines of magnetic force of the driving magnetic element 32 to the driving coil 31, reduce the external magnetic interference, prevent the driving magnetic element 32 from breaking under the influence of an external force, and the metallic framework 242 may prevent the broken driving magnetic element 32 from falling. The driving magnetic element 32 may directly contact the metallic framework 242 to be helpful to manufacture of the optical element driving mechanism 100.

Figure 17:
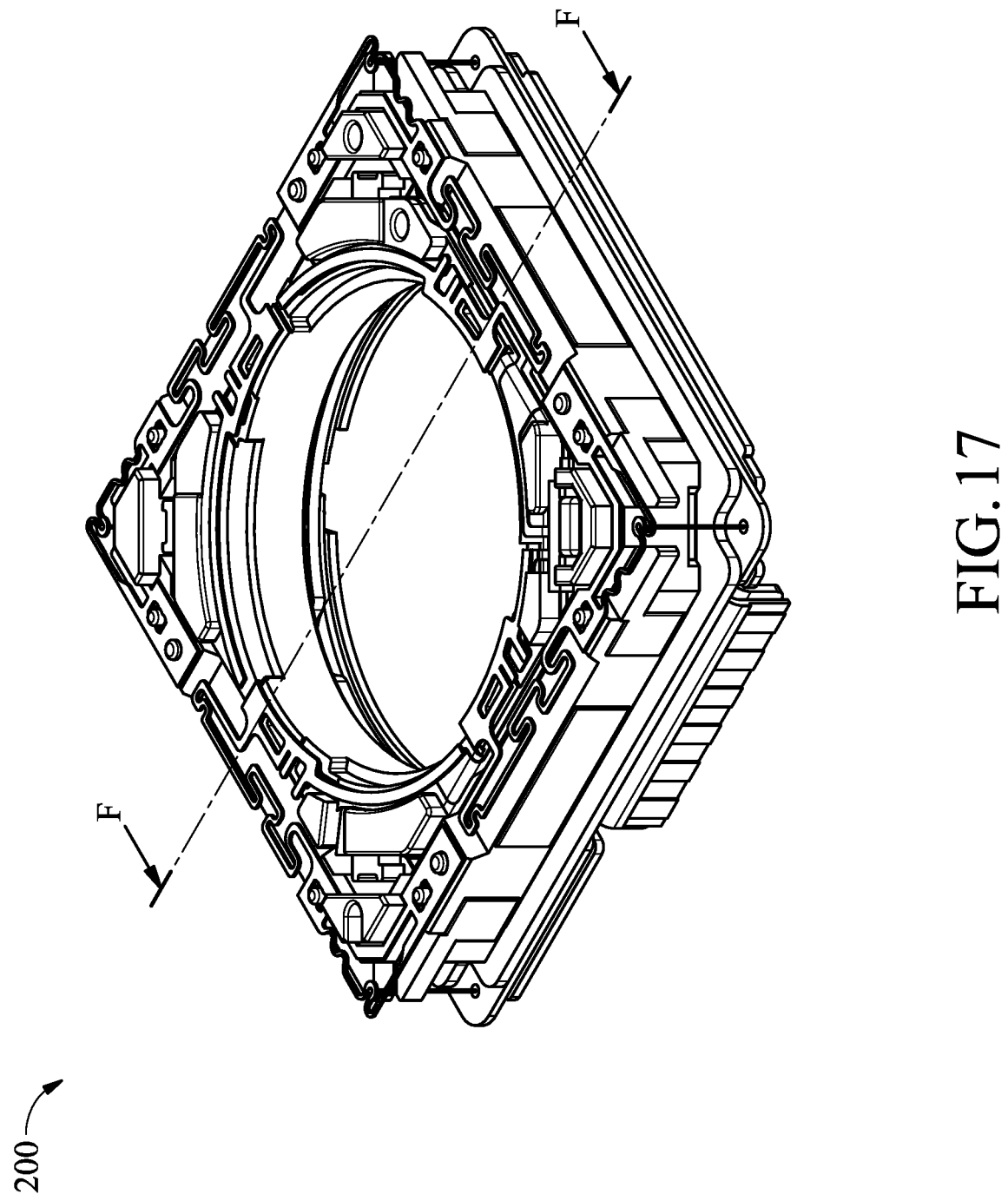
FIG. 17 is a schematic view of an optical element driving mechanism according to another embodiment of the present disclosure.

Please refer to FIG. 17, FIG. 17 is a schematic view of an optical element driving mechanism 200 (the outer frame 14 is omitted) according to another embodiment of the present disclosure. The main structure, function and disposition of the optical element driving mechanism 200 are substantially similar to the optical element driving mechanism 100, and the similar parts are not repeated hereinafter. The main differences between the optical element driving mechanism 200 and the optical element driving mechanism 100 are shown in FIG. 18.

Figure 18:
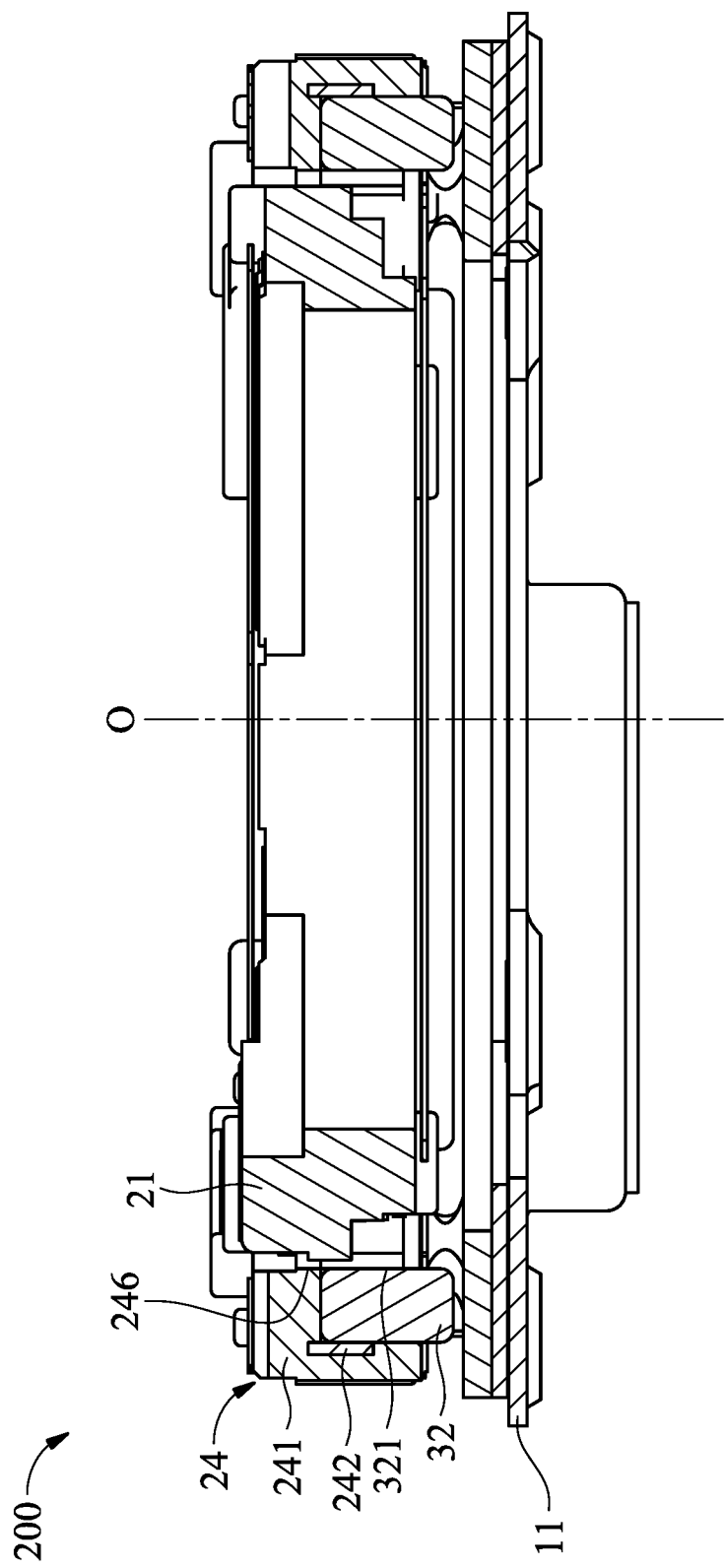
FIG. 18 is a cross-sectional view of the optical element driving mechanism according to the present disclosure along line F-F in FIG. 17.

FIG. 18 is a cross-sectional view along line F-F in FIG. 17. As shown in FIG. 18, the frame 24 has a first side-stop mechanism 246 that faces the holder 21, and the driving magnetic element 32 has a second side-stop mechanism 321 that faces the holder 21. Thus, a range of motion of the holder 21 in a direction perpendicular to the optical axis O may be limited by the first side-stop mechanism 246 or the second side-stop mechanism 321 when the holder 21 moves along the optical axis O and causes a distance between the holder 21 and the metallic base 11 to be different. Excessive flexing of the first elastic element 23, the second elastic element 26 or the third elastic element 27 is prevented.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture and composition of matter, means, methods, and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

While the present disclosure has been described by way of example and in terms of the preferred embodiment, it is to be understood that the invention is not limited thereto, it will be readily understood by those skilled in the art that many of the features, functions, processes, and materials described herein may be varied while remaining within the scope of the present disclosure. Therefore, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
a fixed part;
a movable part, movably connected to the fixed part, comprising:
a holder, carrying an optical element, comprising a surface, a sidewall facing the optical element and a holder groove disposed at a junction of the surface and the sidewall;
a holder stopper protruding from the surface along an optical axis of the optical element to limit a range of motion of the holder; and
a driving assembly driving the movable part to move relative to the fixed part,
wherein the movable part further comprises a first elastic element disposed on the surface, and the first elastic element is flexible along the optical axis,
wherein the first elastic element comprises:
a string connection portion elastically flexible along the optical axis;
an electrical connection portion connected to the holder; and
a holder connection portion located between the string connection portion and the electrical connection portion, connected to the holder.

2. The optical element driving mechanism as claimed in claim 1, further comprising a circuit component disposed on the holder, wherein the circuit component overlaps the first elastic element when observed along the optical axis.

3. The optical element driving mechanism as claimed in claim 1, further comprising a damping member, wherein the holder further comprises a protruding portion, the driving assembly comprises a driving coil, the driving coil is in contact with the protruding portion, and the damping member is disposed on the protruding portion.

4. The optical element driving mechanism as claimed in claim 3, wherein the protruding portion comprises a narrow section to accommodate a part of the driving coil.

5. The optical element driving mechanism as claimed in claim 1, wherein the holder further comprises a stopping portion, and the driving assembly comprises a driving coil, a part of the driving coil is in contact with the stopping portion, and the stopping portion faces away from the surface.

6. The optical element driving mechanism as claimed in claim 1, wherein the fixed part comprises:
a metallic base, comprising a metallic base side; and
a circuit plate, disposed on the metallic base, comprising:
a plate electrical connecting portion;

an insulated portion disposed between the plate electrical connecting portion and the metallic base; and a circuit plate side in contact with the metallic base side.

7. The optical element driving mechanism as claimed in claim 1, wherein the movable part further comprises a frame, and the driving assembly comprises a driving magnetic element, wherein the frame comprises a frame body and a metallic framework, the metallic framework is disposed in the frame body, and the metallic framework is located between the frame body and the driving magnetic element.

8. The optical element driving mechanism as claimed in claim 7, wherein a part of the metallic framework is covered by the frame body, and the other part of the metallic framework is exposed from the frame body.

9. The optical element driving mechanism as claimed in claim 7, wherein the metallic framework comprises an accommodation portion, and a part of the accommodation portion is exposed from the frame body.

10. An optical element driving mechanism, comprising:
a fixed part;
a movable part, movably connected to the fixed part, carrying an optical element and comprising:
a first elastic element;
a frame, connected to the first elastic element, comprising:
a frame body;
a positioning assembly, disposed on the frame body, protruding along an optical axis of the optical element and fixing the first elastic element; and
a first groove, accommodating a part of the first elastic element; and
a frame stop assembly, protruding along the optical axis and limiting a range of motion of the movable part;
a driving assembly, driving the movable part to move relative to the fixed part; and
an adhesive,
wherein a length of the frame stop assembly in a direction of the optical axis is greater than a length of the positioning assembly in the direction of the optical axis,
wherein the movable part further comprises a second elastic element, the frame body comprises a frame groove, and the driving assembly comprises a driving magnetic element, wherein the frame groove is adjacent to the second elastic element and the driving magnetic element, and the adhesive is disposed in the frame groove to fix the second elastic element and the driving magnetic element to the frame body.

11. The optical element driving mechanism as claimed in claim 10, wherein the movable part further comprises a third elastic element movably connected to the fixed part;
wherein the first elastic element is connected to the frame body;
wherein the first elastic element comprises a string connection portion connected to the third elastic element, and the first elastic element is flexible along the optical axis.

12. The optical element driving mechanism as claimed in claim 11, wherein the frame further comprises a second groove accommodating a part of the third elastic element.

13. The optical element driving mechanism as claimed in claim 10, wherein the movable part further comprises a holder elastically connected to the frame body, and the driving assembly comprises:
a driving magnetic element disposed on the frame body;

wherein the frame further comprises a first side-stop mechanism facing the holder to limit a range of motion of the holder in a direction perpendicular to the optical axis;
the driving magnetic element comprises a second side-stop mechanism facing the holder to limit the range of motion of the holder in the direction perpendicular to the optical axis.

14. The optical element driving mechanism as claimed in claim 10, wherein the fixed part comprises:
a metallic base, comprising a metallic base side; and
a circuit plate, disposed on the metallic base, comprising:
a plate electrical connecting portion;
an insulated portion disposed between the plate electrical connecting portion and the metallic base; and
a circuit plate side in contact with the metallic base side.

15. The optical element driving mechanism as claimed in claim 14, wherein the fixed part further comprises a flat coil, the movable part further comprises a connecting portion, and the flat coil comprises a dodging groove corresponding to the connecting portion.

16. The optical element driving mechanism as claimed in claim 10, wherein the frame further comprises a metallic framework, the driving assembly comprises a driving magnetic element, the metallic framework is disposed in the frame body, and the metallic framework is located between the frame body and the driving magnetic element.

17. The optical element driving mechanism as claimed in claim 16, wherein a part of the metallic framework is covered by the frame body, and the other part of the metallic framework is exposed from the frame body.

18. An optical element driving mechanism, comprising:
a fixed part;
a movable part, movably connected to the fixed part, comprising:
a holder, carrying an optical element, comprising a surface, a sidewall facing the optical element and a holder groove disposed at a junction of the surface and the sidewall;
a holder stopper protruding from the surface along an optical axis of the optical element to limit a range of motion of the holder; and
a driving assembly driving the movable part to move relative to the fixed part,
wherein the fixed part comprises:
a metallic base, comprising a metallic base side; and
a circuit plate, disposed on the metallic base, comprising:
a plate electrical connecting portion;
an insulated portion disposed between the plate electrical connecting portion and the metallic base; and
a circuit plate side in contact with the metallic base side.

19. An optical element driving mechanism, comprising:
a fixed part;
a movable part, movably connected to the fixed part, comprising:
a holder, carrying an optical element, comprising a surface, a sidewall facing the optical element and a holder groove disposed at a junction of the surface and the sidewall;
a holder stopper protruding from the surface along an optical axis of the optical element to limit a range of motion of the holder; and
a driving assembly driving the movable part to move relative to the fixed part, wherein the movable part further comprises a frame, and the driving assembly comprises a driving magnetic element, wherein the frame comprises a frame body and a metallic framework, the metallic framework is disposed in the frame body, and the metallic framework is located between the frame body and the driving magnetic element.

20. An optical element driving mechanism, comprising:
a fixed part;
a movable part, movably connected to the fixed part, carrying an optical element and comprising:
  a first elastic element;
  a frame, connected to the first elastic element, comprising:
    a frame body;
    a positioning assembly, disposed on the frame body, protruding along an optical axis of the optical element and fixing the first elastic element; and
    a first groove, accommodating a part of the first elastic element; and
  a frame stop assembly, protruding along the optical axis and limiting a range of motion of the movable part; and
a driving assembly, driving the movable part to move relative to the fixed part,
wherein a length of the frame stop assembly in a direction of the optical axis is greater than a length of the positioning assembly in the direction of the optical axis,
wherein the movable part further comprises a holder elastically connected to the frame body, and the driving assembly comprises:
  a driving magnetic element disposed on the frame body;
wherein the frame further comprises a first side-stop mechanism facing the holder to limit a range of motion of the holder in a direction perpendicular to the optical axis;
wherein the driving magnetic element comprises a second side-stop mechanism facing the holder to limit the range of motion of the holder in the direction perpendicular to the optical axis.

21. An optical element driving mechanism, comprising:
a fixed part;
a movable part, movably connected to the fixed part, carrying an optical element and comprising:
a first elastic element;
a frame, connected to the first elastic element, comprising:
  a frame body;
  a positioning assembly, disposed on the frame body, protruding along an optical axis of the optical element and fixing the first elastic element; and
  a first groove, accommodating a part of the first elastic element; and
a frame stop assembly, protruding along the optical axis and limiting a range of motion of the movable part; and
a driving assembly, driving the movable part to move relative to the fixed part,
wherein a length of the frame stop assembly in a direction of the optical axis is greater than a length of the positioning assembly in the direction of the optical axis,
wherein the fixed part comprises:
  a metallic base, comprising a metallic base side; and
  a circuit plate, disposed on the metallic base, comprising:
    a plate electrical connecting portion;
    an insulated portion disposed between the plate electrical connecting portion and the metallic base; and
    a circuit plate side in contact with the metallic base side.

22. An optical element driving mechanism, comprising:
a fixed part;
a movable part, movably connected to the fixed part, carrying an optical element and comprising:
a first elastic element;
a frame, connected to the first elastic element, comprising:
  a frame body;
  a positioning assembly, disposed on the frame body, protruding along an optical axis of the optical element and fixing the first elastic element; and
  a first groove, accommodating a part of the first elastic element; and
a frame stop assembly, protruding along the optical axis and limiting a range of motion of the movable part; and
a driving assembly, driving the movable part to move relative to the fixed part,
wherein a length of the frame stop assembly in a direction of the optical axis is greater than a length of the positioning assembly in the direction of the optical axis,
wherein the frame further comprises a metallic framework, the driving assembly comprises a driving magnetic element, the metallic framework is disposed in the frame body, and the metallic framework is located between the frame body and the driving magnetic element.

* * * * *